United States Patent
Cantrell

(10) Patent No.: US 10,579,932 B1
(45) Date of Patent: Mar. 3, 2020

(54) COMPUTER SYSTEM AND METHOD FOR CREATING AND DEPLOYING AN ANOMALY DETECTION MODEL BASED ON STREAMING DATA

(71) Applicant: Uptake Technologies, Inc., Chicago, IL (US)

(72) Inventor: Michael Cantrell, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 4 days.

(21) Appl. No.: 16/031,584

(22) Filed: Jul. 10, 2018

(51) Int. Cl.
  *G06F 9/00* (2006.01)
  *G06N 7/00* (2006.01)
  *G06F 17/16* (2006.01)
  *G06F 17/18* (2006.01)
  *G06N 20/00* (2019.01)
  *G06F 16/2455* (2019.01)

(52) U.S. Cl.
  CPC ......... *G06N 7/00* (2013.01); *G06F 16/24568* (2019.01); *G06F 17/16* (2013.01); *G06F 17/18* (2013.01); *G06N 20/00* (2019.01)

(58) Field of Classification Search
  USPC .......................................................... 726/12
  See application file for complete search history.

(56) References Cited

U.S. PATENT DOCUMENTS

| 5,566,092 A | 10/1996 | Wang et al. |
| 5,633,800 A | 5/1997 | Bankert et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |

(Continued)

FOREIGN PATENT DOCUMENTS

| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Amare F Tabor
(74) *Attorney, Agent, or Firm* — Lee Sullivan Shea & Smith LLP

(57) ABSTRACT

A computing system may operate in a first mode during which it calculates a set of training metrics on a running basis as a stream of multivariate data points originating from a data source is being received. While operating in the first mode, the computing system may determine that the set of training metrics has reached a threshold level of stability. In response, the computing system may transition to a second mode during which its extracts a model object and calculates a set of model parameters for an anomaly detection model. While operating in the second mode, the computing system may determine that the set of model parameters has reached a threshold level of stability. In response, the computing system may transition to a third mode during which it uses the anomaly detection model to monitor for anomalies in the stream of multivariate data points originating from the data source.

18 Claims, 10 Drawing Sheets

(56) References Cited

U.S. PATENT DOCUMENTS

| | | | |
|---|---|---|---|
| 6,473,659 B1 | 10/2002 | Shah et al. | |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,739,211 B2 * | 6/2010 | Coffman | G06Q 30/02 706/45 |
| 7,756,678 B2 | 7/2010 | Bonissone et al. | |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 9,244,711 B1 * | 1/2016 | Kondaveeti | G06F 9/45533 |
| 9,667,641 B2 * | 5/2017 | Muddu | G06F 3/0482 |
| 9,940,184 B2 * | 4/2018 | Shibuya | G06F 11/00 |
| 10,334,328 B1 * | 6/2019 | Rosen | G11B 27/031 |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2004/0181712 A1 | 9/2004 | Taniguchi et al. | |
| 2004/0243636 A1 | 12/2004 | Hasiewicz et al. | |
| 2005/0119905 A1 | 6/2005 | Wong et al. | |
| 2005/0222747 A1 | 10/2005 | Vhora et al. | |
| 2007/0263628 A1 | 11/2007 | Axelsson et al. | |
| 2008/0059080 A1 | 3/2008 | Greiner et al. | |
| 2008/0059120 A1 | 3/2008 | Mao et al. | |
| 2012/0271612 A1 | 10/2012 | Barsoum et al. | |
| 2012/0310597 A1 | 12/2012 | Uchiyama et al. | |
| 2013/0009896 A1 * | 1/2013 | Zaliva | G06F 3/0416 345/173 |
| 2013/0010610 A1 | 1/2013 | Karthikeyan et al. | |
| 2013/0024416 A1 | 1/2013 | Herzog | |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0089035 A1 | 3/2014 | Jericho et al. | |
| 2014/0105481 A1 | 4/2014 | Hasselbusch et al. | |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0213466 A1 * | 7/2014 | Schloss | G01N 33/5008 506/9 |
| 2014/0222355 A1 | 8/2014 | Cheim et al. | |
| 2014/0330600 A1 | 11/2014 | Candas et al. | |
| 2014/0330749 A1 | 11/2014 | Candas et al. | |
| 2014/0351642 A1 | 11/2014 | Bates et al. | |
| 2014/0357295 A1 | 12/2014 | Skomra et al. | |
| 2014/0358601 A1 | 12/2014 | Smiley et al. | |
| 2015/0046870 A1 | 2/2015 | Goldenberg et al. | |
| 2015/0262060 A1 | 9/2015 | Husain et al. | |
| 2017/0372224 A1 * | 12/2017 | Reimann | G06N 20/00 |
| 2018/0039717 A1 * | 2/2018 | Bak | G06F 17/5009 |
| 2019/0050515 A1 * | 2/2019 | Su | G06N 20/00 |
| 2019/0147300 A1 * | 5/2019 | Bathen | G06K 9/6284 706/12 |
| 2019/0294485 A1 * | 9/2019 | Kukreja | G06F 11/0772 |
| 2019/0294534 A1 * | 9/2019 | Kennedy | G06F 11/3676 |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

(56) References Cited

OTHER PUBLICATIONS

Infor Introduces Next-Generation Solution for Equipment Dealers and Service Providers, Infor.com (Feb. 20, 2014).
Infor Equipment for Rental, Infor.com (2013).
Waltermire et al, Applying the Continuous Monitoring Technical Reference Model to the Asset, Configuration, and Vulnerability Management Domains (DRAFT), NIST (Jan. 2012).
Inka Saarinen. "Adaptive real-time anomaly detection for multi-dimensional streaming data." Masters Thesis, Aalto University School of Science Degree Programme in Life Science Technologies, Feb. 22, 2017, 91 pages.
Ahmad et al. "Unsupervised real-time anomaly detection for streaming data." Neurocomputing 262, Jun. 2, 2017, pp. 134-147.
Sebastian Raschka. "Principal Component Analysis in 3 Simple Steps." sebastianraschka.com/Articles/2015_pca_in_3_steps_html. Jan. 27, 2015, 26 pages.

\* cited by examiner

COMPUTER SYSTEM AND METHOD FOR CREATING AND DEPLOYING AN ANOMALY DETECTION MODEL BASED ON STREAMING DATA

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with sensors that are configured to monitor various operating parameters of the asset and an on-asset computer that is configured to send data indicative of these operating parameters over a network to a central data analytics platform that is configured to analyze the data, in order to learn more about the operation of the assets.

OVERVIEW

One of the operations that is commonly performed by a data analytics platform is anomaly detection, which generally refers to a process of analyzing data originating from a given data source in order to identify anomalies in that data that may be indicative of a potential problem at the data source. For instance, a data analytics platform may be configured to monitor for anomalies in operating data originating from an asset, which may be indicative of a potential problem with the operation of the asset that should be addressed (e.g., a component failure). A data analytics platform may perform anomaly detection in various other contexts as well.

In order to perform anomaly detection on data originating from a data source, some existing data analytics platforms may be configured to create an anomaly detection model that is subsequently applied to data received from the data source. At a high level, the process for creating an anomaly detection model may involve at least three core steps: (1) deriving a set of training metrics from a set of training data, (2) extracting a model object for the anomaly detection model, and (3) determining a set of model parameters for the anomaly detection model (e.g., anomaly thresholds). Further, existing data analytics platforms typically carry out this process in a batch fashion, which means that the platforms create and then regularly update the anomaly detection model based on large windows of training data stored in memory that are referred to as "batches" (e.g., data received from the data source during a past window of time that may span one or more weeks, months, etc.).

However, the existing approach of creating an anomaly detection model based on an entire batch of training data is a resource-intensive process that places a substantial burden on a computing system tasked with carrying out that process. Indeed, these existing approaches require a computing system to collect and load an entire batch of training data in memory before the process of creating the anomaly detection model can even begin, which means that the computing system must be equipped with a memory that has enough storage capacity to hold an entire batch of training data. Further, the step of deriving a set of training metrics from an entire batch of training data may be a compute-intensive task that consumes a significant amount of processing resources, particularly for larger batches of training data. Further yet, the step of extracting a model object for an anomaly detection model is typically a compute-intensive task that consumes a significant amount of processing resources.

The resource-intensive nature of the existing approach for creating an anomaly detection model gives rise to several problems. First, the existing approach for creating an anomaly detection model can only be carried out by computing systems that are equipped with enough memory and processing power to carry out compute-intensive tasks on large batches of training data, which limits where an anomaly detection model can be created. For instance, if the data source for which an anomaly detection model is desired takes the form of an asset, then this typically requires a centralized data analytics platform to create the anomaly detection model for the asset, because a conventional on-asset computer typically does not have sufficient memory to hold an entire batch of training data and also may not have sufficient processing power to carry out the compute-intensive tasks that are involved in the process for creating an anomaly detection model. However, such an arrangement generally requires the training data to be transmitted from the asset to the centralized data analytics platform over a network, which may increase the cost associated with the process for creating the anomaly detection model, introduce additional delay into the process for creating the anomaly detection model, and/or halt the process entirely in circumstances where the asset does not have network connectivity with the centralized data analytics platform. As such, it would be beneficial to have an approach for creating an anomaly detection model that can be carried out by a broader range of computing systems, including but not limited computing systems that can be affixed assets.

Second, the existing approach for creating an anomaly detection model typically requires the anomaly detection model to be regularly updated in a batch fashion (e.g., each time a new batch of training data is ready to be processed), which means that the compute-intensive extraction step is also regularly performed in a batch fashion. However, this repeated performance of the extraction step may impose an unnecessary strain on the computing system that is tasked with creating the anomaly detection model, and may ultimately inhibit the computing system's ability to perform other tasks. As such, it would be beneficial to have an approach for creating an anomaly detection model that minimizes how frequently the extraction step is performed.

Third, as noted above, the existing approach for creating an anomaly detection model typically requires a computing system to wait until an entire batch of training data has been received and loaded into memory before the computing system can carry out any of the aforementioned steps for creating the anomaly detection model. As a result, there may be unnecessary and/or undesirable delays introduced into the process for creating and ultimately deploying the anomaly detection model—particularly in scenarios where the computing system is receiving the training data in a streaming fashion.

To help improve upon these and other problems with existing approaches for creating an anomaly detection model, disclosed herein is a new process for creating and then deploying an anomaly detection model based on streaming multivariate data. The disclosed process may be used to create and deploy various types of anomaly detection models, including but not limited to an anomaly detection model based on principal component analysis (PCA). Further, the disclosed process may be carried out by any computing system that has access to streaming multivariate data and has sufficient computing capability to perform data analytics operations, including but not limited to a local analytics device that is part of an asset or a centralized asset data platform that has access to streaming multivariate data. For purposes of this disclosure, the computing system that is tasked with carrying out the disclosed process may generally be referred to herein as a "data analytics platform."

In accordance with the present disclosure, the disclosed process may include (1) a data acquisition phase that is generally directed to receiving a stream of multivariate data points originating from a given data source, (2) a training metrics phase that is generally directed to determining an initial set of training metrics for use in creating an anomaly detection model, (3) a model creation phase that is generally directed to extracting an initial model object and determining an initial set of model parameters (e.g., anomaly thresholds) for the anomaly detection model, and (4) a model deployment phase that is generally directed to using the created anomaly detection model to determine whether an anomaly has occurred in the stream of multivariate data points received from the given data source. As described herein, each phase may take various forms and may be carried out in various manners.

For instance, the disclosed process may begin with a data acquisition phase during which a computing system tasking with carrying out the process functions to receive a stream of multivariate data points originating from a given data source (e.g., a stream of sensor data originating from an asset) and optionally perform certain pre-processing operations on the received data points before directing them to the other phases of the disclosed process. In a scenario where the received stream includes data points belong to multiple different "modes" (i.e., classes of data points that have distinctly different values), the computing system may be configured to run separate instances of the phases for creating and deploying the anomaly detection model for each mode, and data acquisition phase may involve a mode detection operation that serves to (1) detect the mode to which each received data point belongs and then (2) direct each received data point to the phases for creating and deploying the anomaly detection model that are specific to the detected mode.

After receiving the streaming data points originating from data source 601 (and potentially performing pre-processing and/or mode detection operations), the data acquisition phase may be configured to direct the received data points to one of the other phases of the disclosed process, depending on how far along the data analytics platform is within the disclosed process.

For instance, when the data analytics platform first begins carrying out the disclosed process, the data acquisition phase may feed the received data points to the training metrics phase, which is generally directed to determining an initial set of training metrics for use in creating an anomaly detection model. At a high level, this training metrics phase may involve (1) calculating a set of training metrics on a running basis as the data analytics platform receives the stream of multivariate data points originating from the given data source, (2) monitoring whether the set of training metrics being calculated on a running basis has reached a threshold level of stability, and (3) once a determination has been made that the set of training metrics being calculated on a running basis has reached a threshold level of stability, defining the set of training metrics at the time of the determination as the initial set of training metrics for use in creating the anomaly detection model. In other words, during the training metrics phase, the data analytics platform may determine whether there has been enough streaming data received from the given data source such that the set of training metrics being calculated on a running basis are no longer changing significantly, and when this stability level has been reached, the data analytics platform may "fix" the values for the set of training metrics and thereby establish the initial set of training metrics for use in creating the anomaly detection model.

Once the data analytics platform has determined that the training metrics have reached a threshold level of stability and used the values of the training metrics at that point to establish the initial set of training metrics, the data analytics platform may transition from the training metrics phase to the model creation phase of the disclosed process, which may cause the data acquisition phase to begin feeding the received stream of multivariate data points to the model creation phase.

Upon entering the model creation phase, the data analytics platform may first use the initial set of training metrics to extract an initial model object for the anomaly detection model. In turn, the data analytics platform use the initial model object to determine an initial set of model parameters (e.g., a set of anomaly thresholds) for the anomaly detection model, which may involve (1) using the initial model object to score the streaming data points originating from the given data source that are received during the model creation phase, (2) using the scored data points to calculate a set of model parameters on a running basis, (3) monitoring whether the set of model parameters being calculated on a running basis has reached a threshold level of stability, and (4) once a determination has been made that the set of model parameters being calculated on a running basis has reached a threshold level of stability, defining the set of model parameters at the time of the determination as the initial set of model parameter for the anomaly detection model.

Once the initial set of model parameters for the anomaly detection model are defined, the data analytics platform may transition from the model creation phase to the model deployment phase of the disclosed process, which may cause the data acquisition phase to begin feeding the received stream of multivariate data points originating from the given data source to the model deployment phase.

During the model deployment phase, the data analytics platform may use the anomaly detection model created during the previous phase to monitor for anomalies in the stream of multivariate data points originating from the given data source, which may involve (1) using the model object of the anomaly detection model to score streaming data points originating from the given data source that are received during the model deployment phase, (2) evaluating whether each of the scored data points violates the initial set of model parameters such that the data point is deemed to be an "exceedance," and (3) evaluating whether the exceedances detected in the stream of multivariate data points collectively amount to an anomaly (e.g., using a sliding window approach or the like).

After the disclosed process has progressed to the model deployment phase, the data analytics platform may then continue to use the created anomaly detection model to monitor for anomalies as the data analytics system continues to receive the stream of multivariate data points originating from the given data source.

In some embodiments, even after establishing the initial set of training metrics for creating the anomaly detection model, the data analytics platform may continue to calculate the training metrics on a running basis using streaming data points originating from the given data source that are received after the training metrics phase (e.g., the streaming data points that are received and used during the model creation and/or model deployment phases). At some point, the data analytics platform may then determine that the current set of training metrics is meaningfully different from the initial set of training metrics, which may trigger the data analytics platform to (1) re-run the model creation phase such that an updated model object is extracted and an updated set of model parameters is determined and then (2) re-deploy the anomaly detection model with the updated model object and the updated set of model parameters.

In other embodiments, even after establishing the initial set of model parameters for the anomaly detection model, the data analytics platform may continue to calculate the model parameters on a running basis using streaming data points originating from the given data source that are received after the model creation phase (e.g., the streaming data points that are received and used during the model deployment phase). At some point, the data analytics platform may then determine that the current set of model parameters is meaningfully different from the initial set of model parameters, which may trigger the data analytics platform to (1) update the set of model parameters for the anomaly detection model and then (2) re-deploy the anomaly detection model with the updated set model parameters.

In the foregoing embodiments, the data analytics platform may also choose to use only a subset of the streaming data points originating from the given data source to update the training metrics and/or the model parameters. For instance, the data analytics platform update the training metrics and/or the model parameters based only on streaming data points originating from the given data source that were evaluated during the model deployment phase and found not to be exceedances. The set of streaming data points that is used to update the training metrics and/or the model parameters may take other forms as well.

The disclosed process for creating and deploying an anomaly detection model based on streaming data may take various other forms and include various other functions as well.

Based on the foregoing, it will be appreciated that the disclosed process for creating and deploying an anomaly detection model may provide several advantages over existing approaches for creating and deploying an anomaly detection model. For example, because the disclosed process does not require a computing system to create an anomaly detection model based on an entire batch of training data, the disclosed process enables a wider range of computing systems to create an anomaly detection model—including a local analytics device that can be affixed an asset. As another example, the disclosed process creates an anomaly detection model in a more dynamic and intelligent manner, which improves the efficiency of the process for creating an anomaly detection model in a way that may reduce the time and/or resources required to carry out the process. As described herein, the disclosed process gives rise to other advantages as well.

Accordingly, in one aspect, disclosed herein is a method that involves (a) receiving, at a computing system, a stream of multivariate data points originating from a given data source, (b) operating in a first mode during which the computing system calculates a set of training metrics on a running basis as the computing system receives the stream of multivariate data points originating from the given data source, (c) while operating in the first mode, making a determination that the set of training metrics being calculated on a running basis has reached a threshold level of stability, where the set of training metrics at the time of the determination is defined as an initial set of training metrics to use for creating an anomaly detection model that comprises an initial model object and an initial set of model parameters, (d) in response to the determination that the set of training metrics being calculated on a running basis has reached the threshold level of stability, transitioning to a second mode during which the computing system (1) uses the initial set of training metrics to extract the initial model object for the anomaly detection model and (2) uses the initial model object for the anomaly detection model to calculate a set of model parameters for the anomaly detection model on a running basis as the computing system continues to receive the stream of multivariate data points originating from the given data source, (e) while operating in the second mode, making a determination that the set of model parameters being calculated on a running basis has reached a threshold level of stability, where the set of model parameters at the time of the determination is defined as the initial set of model parameters for the anomaly detection model, and (f) in response to the determination that the set of model parameters being calculated on a running basis has reached the threshold level of stability, transitioning to a third mode during which the computing system uses the anomaly detection model to monitor for anomalies as the computing system continues to receive the stream of multivariate data points originating from the given data source.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is non-transitory computer-readable storage medium having program instructions stored thereon that are executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
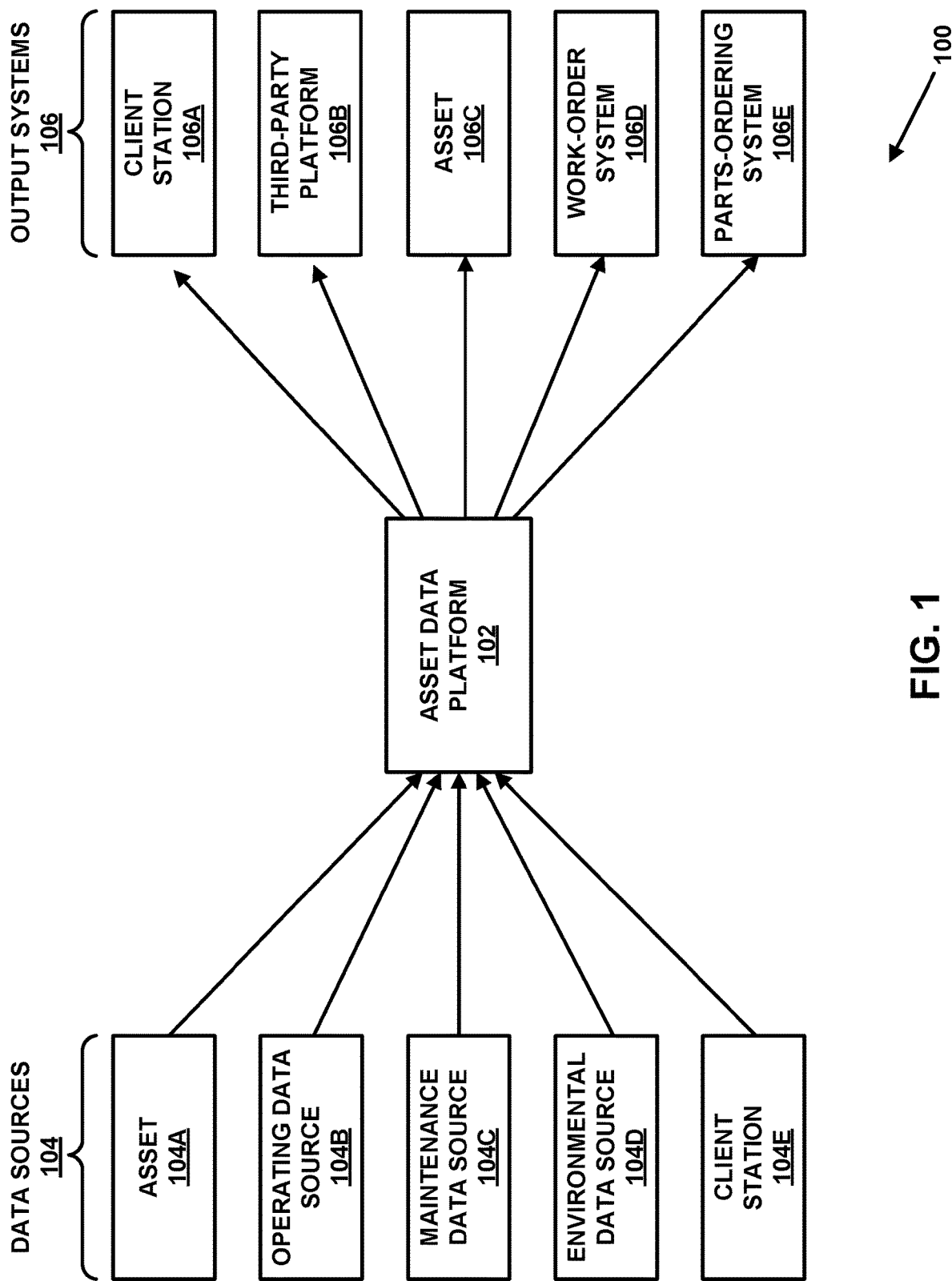
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset fleet management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
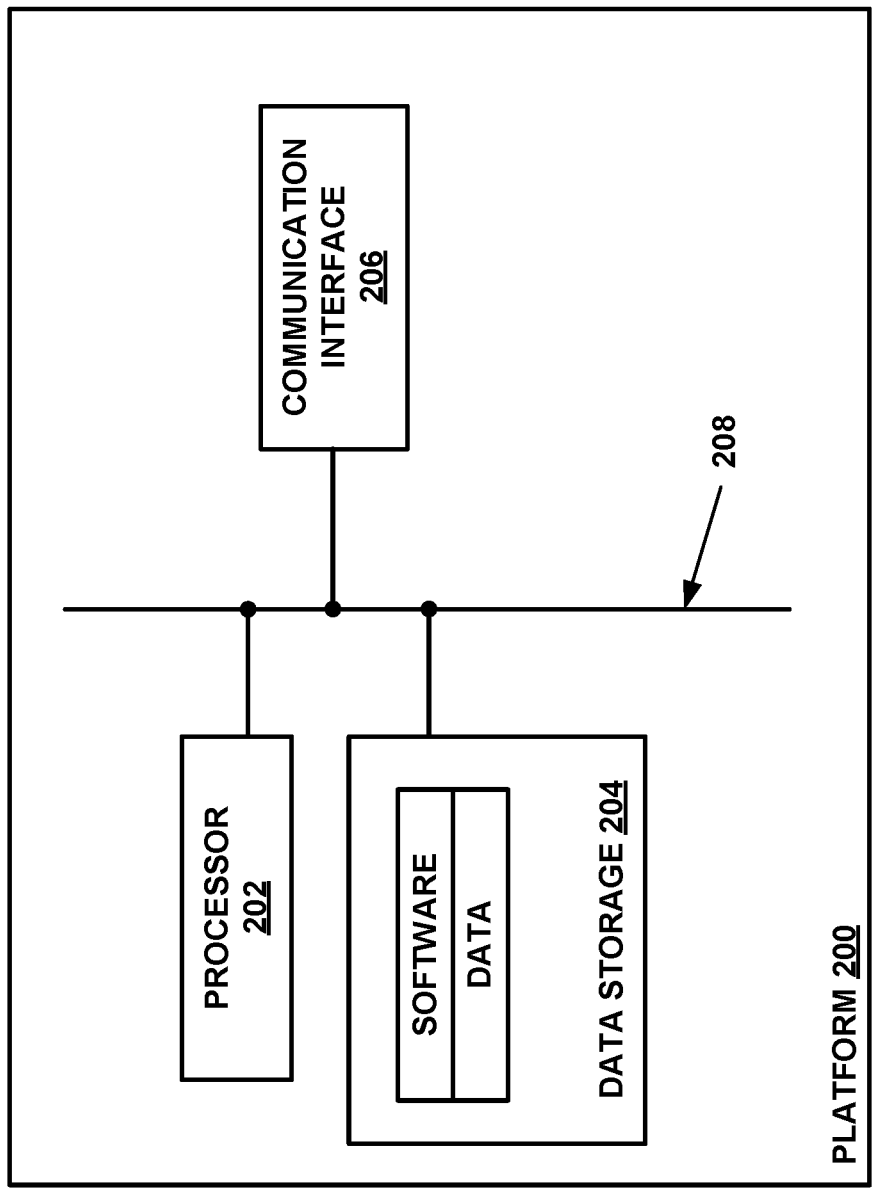
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
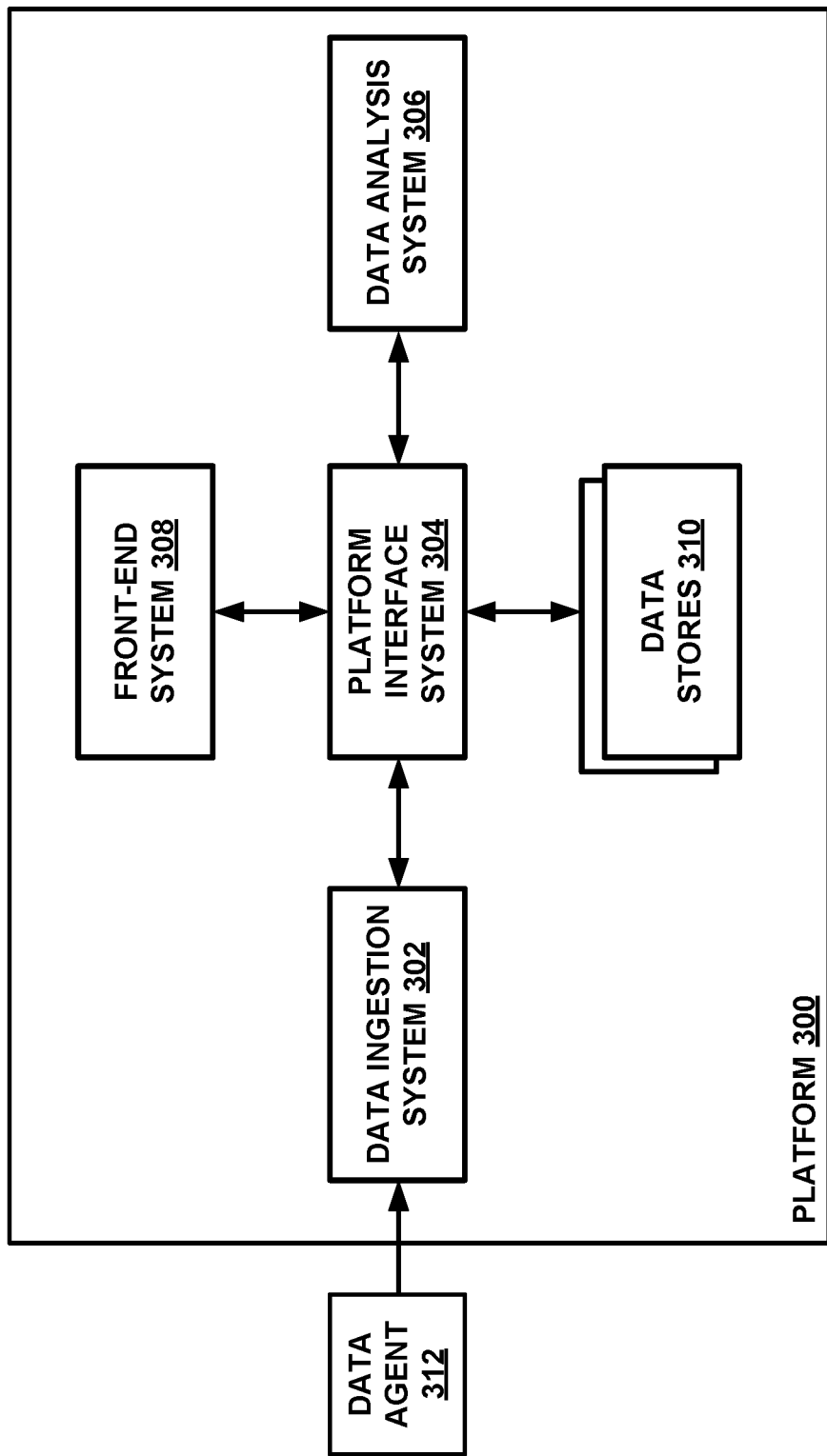
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. EXAMPLE ASSET

As discussed above with reference to FIG. 1, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 4:
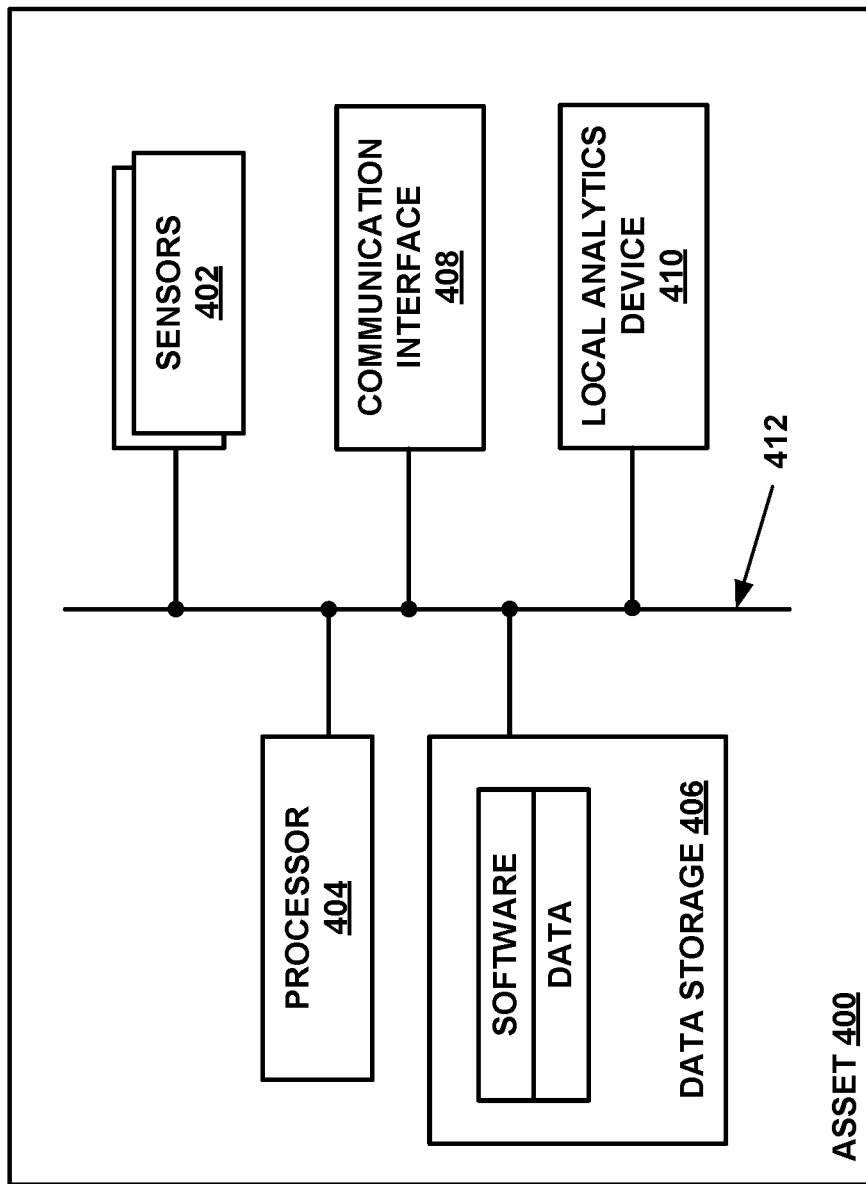
FIG. 4 depicts a simplified block diagram of the on-board components of an example asset.

In addition to the aforementioned components, an asset may also be equipped with a set of on-board components that enable the asset to capture and report operating data. To illustrate, FIG. 4 is simplified block diagram showing some on-board components for capturing and reporting operating data that may be included within or otherwise affixed to an example asset 400. As shown, these on-board components may include sensors 402, a processor 404, data storage 406, a communication interface 408, and perhaps also a local analytics device 410, all of which may be communicatively coupled by a communication link 412 that may take the form of a system bus, a network, or other connection mechanism.

In general, sensors 402 may each be configured to measure the value of a respective operating parameter of asset 400 and then output data that indicates the measured value of the respective operating parameter over time. In this respect, the operating parameters of asset 400 that are measured by sensors 402 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 402 may each be configured to measure the value of a respective operating parameter continuously, periodically (e.g., based on a sampling frequency), and/or in response to some triggering event. In this respect, each sensor 402 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 402 may each be configured to output data that indicates the measured value of its respective operating parameter continuously, periodically (e.g., based on a sampling frequency), and/or in response to some triggering event.

Based on the foregoing, it will be appreciated that sensors 402 may take various different forms depending on the type of asset, the type of operating parameter being measured, etc. For instance, in some cases, a sensor 402 may take the form of a general-purpose sensing device that has been programmed to measure a particular type of operating parameter. In other cases, a sensor 402 may take the form of a special-purpose sensing device that has been specifically designed to measure a particular type of operating parameter (e.g., a temperature sensor, a GPS receiver, etc.). In still other cases, a sensor 402 may take the form of a special-purpose device that is not primarily designed to operate as a sensor but nevertheless has the capability to measure the value of an operating parameter as well (e.g., an actuator). Sensors 402 may take other forms as well.

Processor 404 may comprise one or more processor components, such as general-purpose processors, special-purpose processors, programmable logic devices, controllers, and/or any other processor components now known or later developed. In turn, data storage 406 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4, data storage 406 may be arranged to contain executable program instructions (i.e., software) that cause asset 400 to perform various functions related to capturing and reporting operating data, along with associated data that enables asset 400 to perform these operations. For example, data storage 406 may contain executable program instructions that cause asset 400 to obtain sensor data from sensors 402 and then transmit that sensor data to another computing system (e.g., asset data platform 102). As another example, data storage 406 may contain executable program instructions that cause asset 400 to evaluate whether the sensor data output by sensors 402 is indicative of any abnormal conditions at asset 400 (e.g., by applying logic such as threshold-based rules to the measured values output by sensors 402), and then if so, to generate abnormal-condition data that indicates occurrences of abnormal conditions. The executable program instructions and associated data stored in data storage 406 may take various other forms as well.

Communication interface 408 may be configured to facilitate wireless and/or wired communication between asset 400 and various computing systems, including an asset data platform such as asset data platform 102. As such, communication interface 408 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 408 may also include multiple communication interfaces of different types. Other configurations are possible as well. It should also be understood that asset 400 may not be equipped with its own on-board communication interface.

In some circumstances, it may also be desirable to perform certain data analytics operations locally at asset 400, rather than relying on a central platform to perform data analytics operations. Indeed, performing data analytics operations locally at asset 400 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 400 (e.g., processor 404 and data storage 406) may provide sufficient computing power to locally perform data analytics operations at asset 400, in which case data storage 406 may be provisioned with executable program instructions and associated program data for performing the data analytics operations. However, in other cases, the aforementioned on-board components of asset 400 (e.g., processor 404 and/or data storage 406) may not provide sufficient computing power to locally perform certain data analytics operations at asset 400. In such cases, asset 400 may also optionally be equipped with local analytics device 410, which may comprise a computing device that is capable of performing data analytics operations and other complex operations that go beyond the capabilities of the asset's other on-board components. In this way, local analytics device 410 may generally serve to expand the on-board capabilities of asset 400.

Figure 5:
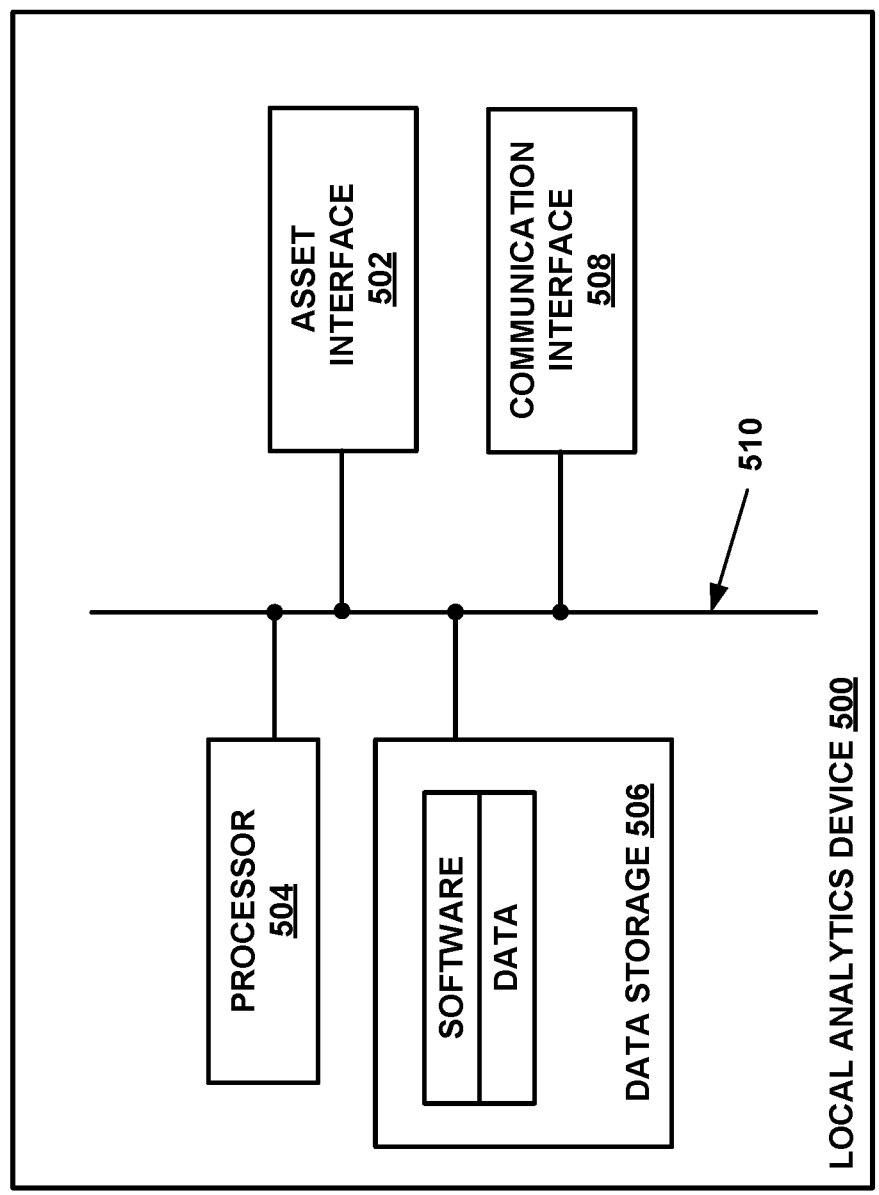
FIG. 5 depicts a simplified block diagram of an example local analytics device.

FIG. 5 illustrates a simplified block diagram showing some components that may be included in an example local analytics device 500. As shown, local analytics device 500 may include an asset interface 502, a processor 504, data storage 506, and a communication interface 508, all of which may be communicatively coupled by a communication link 510 that may take the form of a system bus, a network, or other connection mechanism.

Asset interface 502 may be configured to couple local analytics device 500 to the other on-board components of asset 400. For instance, asset interface 502 may couple local analytics device 500 to processor 404, which may enable local analytics device 500 to receive data from processor 404 (e.g., sensor data output by sensors 402) and to provide instructions to processor 404 (e.g., to control the operation of asset 400). In this way, local analytics device 500 may indirectly interface with and receive data from other on-board components of asset 400 via processor 404. Additionally or alternatively, asset interface 502 may directly couple local analytics device 500 to one or more sensors 402 of asset 400. Local analytics device 500 may interface with the other on-board components of asset 400 in other manners as well.

Processor 504 may comprise one or more processor components that enable local analytics device 500 to execute data analytics programs and/or other complex operations, which may take the form of general-purpose processors, special-purpose processors, programmable logic devices, controllers, and/or any other processor components now known or later developed. In turn, data storage 506 may comprise one or more non-transitory computer-readable storage mediums that enable local analytics device 500 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 5, data storage 506 may be arranged to contain executable program instructions (i.e., software) that cause local analytics device 500 to perform data analytics operations and/or other complex operations that go beyond the capabilities of the asset's other on-board components, as well as associated data that enables local analytics device 500 to perform these operations.

Communication interface 508 may be configured to facilitate wireless and/or wired communication between local analytics device 500 and various computing systems, including an asset data platform such as asset platform 102. In this respect, local analytics device 500 may communicate the results of its operations to an asset data platform via communication interface 508, rather than via an on-board communication interface of asset 400. Further, in circumstances where asset 400 is not be equipped with its own on-board communication interface, asset 400 may use communication interface 508 to transmit operating data to an asset data platform. As such, communication interface 508 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 508 may also include multiple communication interfaces of different types. Other configurations are possible as well.

In addition to the foregoing, local analytics device 500 may also include other components that can be used to expand the on-board capabilities of an asset. For example, local analytics device 500 may optionally include one or more sensors that are configured to measure certain parameters, which may be used to supplement the sensor data captured by the asset's on-board sensors. Local analytics device 500 may include other types of components as well.

Returning to FIG. 4, although not shown, asset 400 may also be equipped with hardware and/or software components that enable asset 400 to adjust its operation based on asset-related data and/or instructions that are received at asset 400 (e.g., from asset data platform 102 and/or local analytics device 410). For instance, as one possibility, asset 400 may be equipped with one or more of an actuator, motor, value, solenoid, or the like, which may be configured to alter the physical operation of asset 400 in some manner based on commands received from processor 404. In this respect, data storage 406 may additionally be provisioned with executable program instructions that cause processor 404 to generate such commands based on asset-related data and/or instructions received via communication interface 408. Asset 400 may be capable of adjusting its operation in other manners as well.

Further, although not shown, asset 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 400.

One of ordinary skill in the art will appreciate that FIGS. 4-5 merely shows one example of the components of an asset, and that numerous other examples are also possible. For instance, the components of an asset may include additional components not pictured, may have more or less of the pictured components, and/or the aforementioned components may be arranged and/or integrated in a different manner. Further, one of ordinary skill in the art will appreciate that two or more of the components of asset 400 may be integrated together in whole or in part. Further yet, one of ordinary skill in the art will appreciate that at least some of these components of asset 400 may be affixed or otherwise added to asset 400 after it has been placed into operation.

IV. EXAMPLE OPERATIONS

As described above, disclosed herein is a new process for creating and deploying an anomaly detection model based on streaming multivariate data. In general, the disclosed process may be used to create any type of anomaly detection model comprising (1) a model object used to "score" input data and (2) a set of model parameters used to evaluate whether the "scored" input data is indicative of an anomaly. Such an anomaly detection model may take various forms.

As one possible example, the disclosed process may be used to create an anomaly detection model based on principal component analysis (PCA), which is a technique that uses linear transformations to transform multivariate data from a first coordinate space defined by an original set of correlated variables to a second coordinate space comprising a set of orthogonal dimensions that are defined by a new set of uncorrelated variables. In such an example, PCA may first be performed on a set of training data in order to extract a PCA model object referred to as a "projection matrix" (or an "Eigenspace"), which may define a reduced-dimensionality PCA coordinate space having dimensions referred to as "Eigenvectors" or "principal components" (PCs). In turn, the projection matrix may be used to "score" multivariate data points. This scoring operation may take various forms.

In one implementation, the data analytics platform may begin the scoring operation for a given data point by inputting the data point into the projection matrix and thereby transforming the data point from its original coordinate space to the PCA coordinate space defined by the projection matrix. As part of this transformation, the data analytics platform may also standardize and/or modify the value of the data point in one or more dimensions of the PCA coordinate space. In this respect, functions that may be carried out in order to standardize and/or modify the value of the data point in one or more dimensions of the PCA coordinate space may take various forms, and some examples of these functions are disclosed in U.S. application Ser. Nos. 15/367,012 and 15/788,622, which are incorporated herein by reference in their entirety. After the data point has been transformed to the PCA coordinate space, the data analytics platform may complete the scoring operation for the data point by inversely transforming the data point from the PCA coordinate space back to the original coordinate space, which produces a "predicted" version of the data point, and then determining a difference value between original and predicted versions of the data point.

The data analytics platform may perform a similar scoring operation for each data point in the received steam, which may result in the determination of a respective difference value for each data point in the received stream. These respective difference values—which may collectively be referred to as the "difference signal" (or "residual signal") of the stream of multivariate data points—may then be evaluated using a set of model parameters in order to determine occurrences of anomalies.

The disclosed process may be used to create other types of anomaly detection models as well, including anomaly detection models based on regression techniques other than PCA.

In practice, the disclosed process for creating and deploying an anomaly detection model based on streaming multivariate data may be carried out by any computing system that has access to streaming multivariate data and has sufficient computing capability to perform data analytics operations, where such a computing system may generally be referred to herein as a "data analytics platform." For instance, as one possibility, the data analytics platform that carries out the disclosed process may take the form of a local analytics device that is part of an asset, such as asset 104A in FIG. 1. As another possibility, the data analytics platform that carries out the disclosed process may take the form of a centralized asset data platform that has access to streaming multivariate data, such as asset data platform 102 in FIG. 1. The data analytics platform that carries out the disclosed process may take various other forms as well.

Further, in some embodiments, it is possible that the responsibility for carrying out the functions of the disclosed process could be distributed across multiple data analytics platforms. For example, in one such embodiment, a centralized asset data platform may be configured to carry out functions of the disclosed process associated with creating the anomaly detection model while an asset's local analytics device may be configured to carry out functions of the disclosed process associated with running the anomaly detection model. The functions of the disclosed process could be distributed across multiple data analytics platforms in other manners as well.

Figure 6:
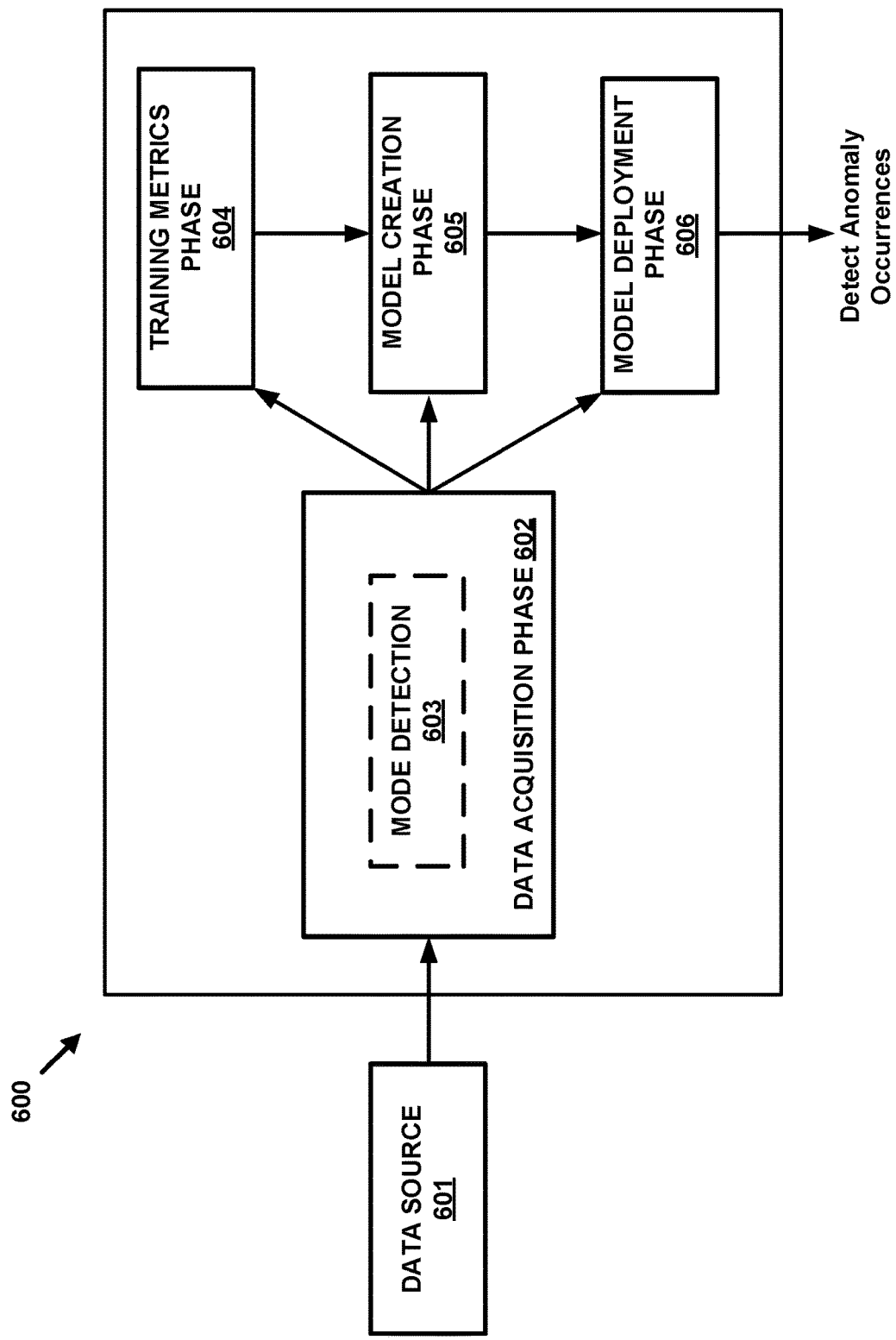
FIG. 6 is a functional block diagram that illustrates example phases that may be included in the disclosed process for creating and deploying an anomaly detection model based on streaming multivariate data.

Referring now to FIG. 6, a functional block diagram 600 is provided that illustrates one example of high-level operations that may be included the disclosed process for creating and deploying an anomaly detection model based on streaming multivariate data. For purposes of illustration, these high-level operations are referred to herein as "phases" of the disclosed process, where certain of these phases may occur in parallel with one another while other phases may occur in sequence with one another. However, it should be understood that the disclosed process is merely described in this manner for the sake of clarity and explanation and that the disclosed process may be implemented in various other manners, including the possibility that example functions may be added, removed, rearranged into different orders, grouped together into different phases, and/or not grouped together into phases at all.

As shown in FIG. 6, the example phases of the disclosed process may include: (1) a data acquisition phase 602 that is generally directed to receiving a stream of multivariate data points originating from a given data source, such as data source 601, (2) a training metrics phase 604 that is generally directed to determining an initial set of training metrics for use in creating an anomaly detection model, (3) a model creation phase 605 that is generally directed to extracting an initial model object and determining an initial set of model parameters (e.g., anomaly thresholds) for the anomaly detection model, and (4) a model deployment phase 606 that is generally directed to using the created anomaly detection model to determine whether an anomaly has occurred in the stream of multivariate data points received from data source 601. Each of these phases are described in more detail below.

A. Data Acquisition Phase

As shown in FIG. 6, the disclosed process may begin with data acquisition phase 602, which is generally directed to receiving a stream of multivariate data points originating from a given data source such as data source 601. In this respect, both data source 601 and the stream of multivariate data points originating from data source 601 may take any of various forms.

As one possible example, data source 601 may take the form of an asset (e.g., asset 104A in FIG. 1) and the stream of multivariate data points may take the form of a stream of sensor data captured by the asset. In this respect, as discussed above, an asset may be equipped with a set of sensors that each serve to capture a time-sequence of values for a respective operating parameter of the asset (e.g., speed, velocity, acceleration, location, weight, temperature, pressure, friction, vibration, power usage, throttle position, fluid usage, fluid level, voltage, current, magnetic field, electric field, presence or absence of objects, current position of a component, and power generation, etc.), where each such value corresponds to a point of time at which the value was measured. As such, the sensor data originating from the asset may take the form of a stream of time-series multivariate data, where each respective data point in the stream comprises a vector of values measured by the asset's sensors at a respective point in time. It is also possible that the asset may derive other time-series data based on the asset's sensor data, in which case this derived data could also be included in the stream of time-series multivariate data originating from the asset.

Data source 601 and the stream of multivariate data points originating from data source 601 may take various other forms as well.

Further, the data analytics platform may receive the stream of multivariate data points originating from data source 601 in various manners. As one possible example, if the data analytics platform is a local analytics device of an asset and data source 601 is the asset, then the local analytics device may receive the stream of multivariate data originating from the asset via a communication interface (e.g., an asset interface) that couples the local analytics device to the asset. As another possible example, if the data analytics platform is a centralized asset data platform and data source 601 is the asset, then the local analytics device may either receive the stream of multivariate data from the asset itself or from another data source (e.g., operating data source 104B) that is configured to receive data from assets and then provide such data in a streaming manner to the centralized asset data platform. Depending on the form of the data analytics platform and/or data source 601, the data analytics platform may receive the stream of multivariate data points originating from data source 601 in various other manners as well.

After receiving the stream of multivariate data points originating from data source 601, the data analytics platform may optionally perform certain pre-processing operations on the received stream. For instance, as one possibility, the data analytics platform may be configured to modify or replace any value included in the received stream of multivariate data points that appears to be invalid or unreliable, such as a value that is missing (e.g., a not-a-number or null value), outside of an acceptable range, and/or invalid in some other manner. In this respect, the function of modifying or replacing the value may involve imputing the new value based on the values of surround data points in the stream. As another possibility, the data analytics platform may be configured to perform fast Fourier transform on the received stream of multivariate data points. The data analytics platform may be configured to perform various other types of pre-processing operations on the received stream of multivariate data points as well.

Depending on the form of data source 601, it is also possible that the stream of multivariate data points originating from data source 601 may include data points belonging to multiple different "modes," which generally refers to classes of data points that have distinctly different values (e.g., in terms of the individual value ranges of certain variables and/or the relationship between the values of certain variables relative to one another). For instance, when looking at a distribution of historical data points originating from data source 601, each different peak within the distribution may be indicative of a different "mode" of data that may be output by data source 601. In this respect, a distribution of historical data points having a single peak may indicate that data source 601 only outputs a single mode of data (i.e., "unimodal" data), a distribution of historical data points having two peaks may indicate that data source 601 may output up to two different modes of data (i.e., "bimodal" data), and so on.

There are various circumstances where data source 601 may output data points belonging to different modes. As one possible example, data source 601 may take the form of an asset that is capable of operating in one of multiple different operating states (e.g., an idle state vs. a heavy usage state), and the asset's sensor data while operating in these different operating states may have distinctly different values (both in terms of the value ranges measured by the asset's sensor and the relationship of the values measured by certain sensors relative to one another) such that the sensor data associated with these different operating states belongs to different modes. Other examples are possible as well.

However, if the data analytics platform attempts to create and/or run an anomaly detection model based on data points originating from data source 601 that belong to different modes, this may result in inaccuracies while attempting to detect anomalies in the stream of data points originating from data source 601. For example, if the data analytics platform attempts to create an anomaly detection model based on data points belonging to different modes, this may result in what effectively amounts to a "mixed-mode" anomaly detection model that does not accurately score multivariate data points belonging to any particular mode. As another example, if the data analytics platform creates an anomaly detection model based on data points belonging to a first mode and then attempts to use the created anomaly detection model to score data points belonging to a second mode, this may lead to the inaccurate detection of anomalies in such data (e.g., in terms of false positives and/or false negatives).

To avoid this degrade in accuracy resulting from creating and/or running an anomaly detection model based on data that belong to different modes, the data analytics platform may be configured to create and deploy a separate anomaly detection model for each different mode detected in the data originating from data source 601. For instance, continuing with the example above where data source 601 takes the form of an asset that is capable of outputting data belonging to a first mode when the asset is operating in an idle state and outputting data belonging to a second mode when the asset is operating in a heavy usage state, the data analytics platform may be configured to create and deploy a first anomaly detection model for data points originating from the asset while operating in an idle state (i.e., data points belonging to the first mode) and a second anomaly detection model for data points originating from the asset while operating in a heavy usage state (i.e., data points belonging to the second mode). Other examples are possible as well.

To facilitate this functionality, the data analytics platform may be configured to carry out a separate instance of phases 604-606 for each different mode that may be detected in the received stream of multivariate data points originating from data source 601, and data acquisition phase 602 may then include a mode detection operation 603 that serves to (1) detect the mode to which each data point in the received stream of multivariate data points belongs and then (2) direct each data point to the instance of phases 604-606 that is specific to the detected mode. (For purposes of illustration only, FIG. 6 shows a single instance of phases 604-606 being fed by data acquisition phase 602, but it should be understood that in an implementation involving mode detection, one or more other instances of phases 604-606 may also be carried out by the data analytics platform).

In order to carry out the mode detection operation 603, the data analytics platform may be provisioned with "mode definition" data that serves to define the criteria for belonging to each of multiple different modes, which the data analytics platform may use to determine which data points originating from data source 601 belong to which mode. This "mode definition" data may take various forms. As one possibility, the "mode definition" data may comprise a respective set of multivariate data value ranges for each different mode. However, the "mode definition" data may take other forms as well.

Further, the "mode definition" data that is used by the mode detection operation 603 may be defined in various manners. As one possibility, the "mode definition" data may be defined as a result of an initial training process during which the data analytics platform (or some other system) (a) analyzes a distribution of historical multivariate data originating from data source 601 to identify different peaks in the distribution that are indicative of different modes in the historical multivariate data (e.g., using a technique such as Kullback-Leibler divergence) and then (2) for each identified peak, identify a respective range of data values for each data variable included within the historical multivariate data that spans from one side of the peak to the other (e.g., one or more standard deviations away from the peak's center point in each direction), which serves as the "mode definition" data for the mode indicated by the peak. As another possibility, the "mode definition" data may be defined based on user input. The "mode definition" data may be defined in other manners as well.

After receiving the streaming data points originating from data source 601 (and potentially performing pre-processing and/or mode detection operations), data acquisition phase 602 may then be configured to direct the received stream of multivariate data points to one of phases 604, 605, or 606, depending on how far along the data analytics platform is within the disclosed process. For instance, when the data analytics platform first begins carrying out the disclosed process, data acquisition phase 602 may direct the received stream of data points to training metrics phase 604. Further, after the set of training metrics data reaches a threshold level of stability such that the data analytics platform has proceeded to model creation phase 605, data acquisition phase 602 may direct the received stream of data points to model creation phase 605. Further yet, after the initial model object has been extracted and the initial set of model parameters has reached a threshold level of stability such that the data analytics platform has proceeded to model deployment phase 606, data acquisition phase 602 may direct the received stream of data points to model deployment phase 606. In this respect, it will be appreciated that a first temporal range of the stream of multivariate data points may be used during training metrics phase 604, a second temporal range of the stream of multivariate data points may be used during model creation phase 605, and a third temporal range of the stream of multivariate data points may be used during model deployment phase 606.

For purposes of explanation only, the functionality of phases 604-606 will now be discussed in the context of a stream of data points originating from data source 601 that all belong to a single mode. However, in line with the discussion above regarding the mode detection operation 603, it should be understood that there may be multiple different instances of phases 604-606 that each correspond to a different mode.

B. Training Metrics Phase

When the data analytics platform first begins carrying out the disclosed process, data acquisition phase 602 may be configured to direct the received stream of data points originating from data source 601 to training metrics phase 604, which is generally directed to determining an initial set of training metrics for use in creating an anomaly detection model. This phase may take various forms and be carried out in various manners.

At a high level, training metrics phase 604 may involve (1) calculating a set of training metrics on a running basis as the data analytics platform receives the stream of multivariate data points originating from data source 601, (2) monitoring whether the set of training metrics being calculated on a running basis has reached a threshold level of stability, and (3) once a determination has been made that the set of training metrics being calculated on a running basis has reached a threshold level of stability, defining the set of training metrics at the time of the determination as the initial set of training metrics for use in creating the anomaly detection model. In other words, during training metrics phase 604, the data analytics platform may determine whether there has been enough streaming data received from data source 601 such that the set of training metrics being calculated on a running basis are no longer changing significantly, and when this stability level has been reached, the data analytics platform may "fix" the values for the set of training metrics and thereby establish the initial set of training metrics for use in creating the anomaly detection model.

In this respect, the set of training metrics that are calculated on a running basis may take various forms, which may depend on the type of anomaly detection model being created. As one example to illustrate, the training metrics being calculated on a running basis for a PCA-based anomaly detection model may include a mean, a variance, a max, a min, and a streaming object from which a correlation matrix can be derived. Additionally, in some implementations, the training metrics being calculated on a running basis for a PCA-based anomaly detection model may also include the correlation matrix itself, which is derived from the other training metrics (and is thus indirectly calculated based on the received stream of multivariate data points). However, in other implementations, the correlation matrix may not be included within the set of training metrics that are calculated on a running basis as the stream of multivariate data points is received, but rather may be derived from the other training metrics on an as-needed basis (e.g., when the data analytics platform transitions from training metrics phase 604 to model creation phase 605). The set of training metrics being calculated on a running basis may take other forms as well.

Further, the function of calculating the set of training metrics on a running basis as the stream of multivariate data points is received may take various forms. As one possibility, the data analytics platform may update certain training metrics each time that a new data point originating from data source 601 is received, so as to keep these training metrics as up-to-date as possible. As another possibility, the data analytics platform may update certain training metrics after a certain number of new data points originating from data source 601 have been received since the last update (e.g., updating every 100 data points) and/or after a certain amount of time has elapsed since the last update, so as to reduce the frequency with which these training metrics are updated. The function of calculating the training metrics on a running basis may take other forms as well.

It should also be understood that the data analytics platform could either be configured to update every training metric in the set with the same regularity or be configured to update different training metrics in the set with different regularities. For instance, in one implementation, the data analytics platform could be configured to update every training metric in the set (including any training metric that is derived from other training metrics) each time a new data point originating from data source 601 is received. In another implementation, the data analytics platform could be configured to update one or more training metrics in the set each time a new data point originating from data source 601 is received and to update one or more other training metrics in the set with less frequency (e.g., each time a certain number of new data points originating from data source 601 have been received and/or a certain amount of time has elapsed since the last update). Such an approach may be useful in a scenario where at least one training metric in the set is derived from the other training metrics (e.g., a correlation matrix for a PCA-based anomaly detection model), as that "derived" training metric could be updated less frequently than the other training metrics to help further reduce the computational burden on the data analytics platform. Many other examples are possible as well.

Further yet, the function of monitoring and determining whether the set of training metrics has reached a threshold level of stability may take various forms. In one possible implementation, the data analytics platform may be configured to periodically sample the training metrics' values while they are being calculated on a running basis. For instance, the data analytics platform may be configured to sample the training metrics' values each time a certain number of new streaming data points have been received since the last sample was captured (e.g., sampling the training metrics' values every 100 streaming data points) and/or each time a certain amount of time has elapsed since the last sample was captured. The data analytics platform may be configured to sample the training metrics' values at other times as well.

As the data analytics platform is periodically sampling the training metrics' values, the data analytics platform may also periodically evaluate a certain number of the most-recent samples of the training metrics' values (e.g., the 10 most-recently captured samples) relative to one another to determine whether such samples are similar enough (i.e., whether such samples have converged enough) to indicate that the training metrics have reached a threshold level of stability. For instance, as one possibility, the data analytics platform may perform such an evaluation each time the data analytics platform captures a new sample of the training metrics' values, which effectively amounts to a sliding window approach where each new sample replaces the oldest sample in the set of most-recent samples to be evaluated. As another possibility, the data analytics platform may perform such an evaluation each time a certain number of new samples have been captured since the last evaluation was performed (e.g., after 10 new samples have been captured), where the number of new samples to be captured before the next evaluation could either be the same as or different than the number of most-recent samples to be evaluated relative to one another. As yet another possibility, the data analytics platform may perform such an evaluation each time a certain amount of time has elapsed since the last sample last evaluation was performed. The data analytics platform may be configured to evaluate a set of most-recent samples of the training metrics' values at other times as well.

Further, the data analytics platform's evaluation of the set of most-recent samples of the training metrics' values relative to one another may take various forms. As one possibility, this evaluation may involve (1) if necessary, transforming the most-recent samples of the training metrics' values into a format that enables the data analytics platform to measure a distance between these samples, (2) calculating a respective distance between each different pairwise combination of samples in the set of most recent samples, and (3) determining whether each such distance falls below a threshold that defines a maximum allowable distance between a pair of samples that are considered to have sufficiently converged. However, the data analytics platform may determine whether the set of most-recent samples of the training metrics' values are similar enough to one another to indicate that the training metrics have reached a threshold level of stability in various other manners as well.

Once the data analytics platform determines that the set of training metrics has reached a threshold level of stability, the data analytics platform may use the training metrics' values at that point to define the initial set of training metrics for creating the anomaly detection model. In turn, the data analytics platform may transition from training metrics phase 604 to model creation phase 605 of the disclosed process, which may cause data acquisition phase 602 to begin directing the received stream of multivariate data points originating from data source 601 to model creation phase 605.

C. Model Creation Phase

Model creation phase 605 is generally directed to extracting an initial model object and determining an initial set of model parameters for the anomaly detection model. Model creation phase 605 may take various forms and may be carried out in various manners.

Figure 7:
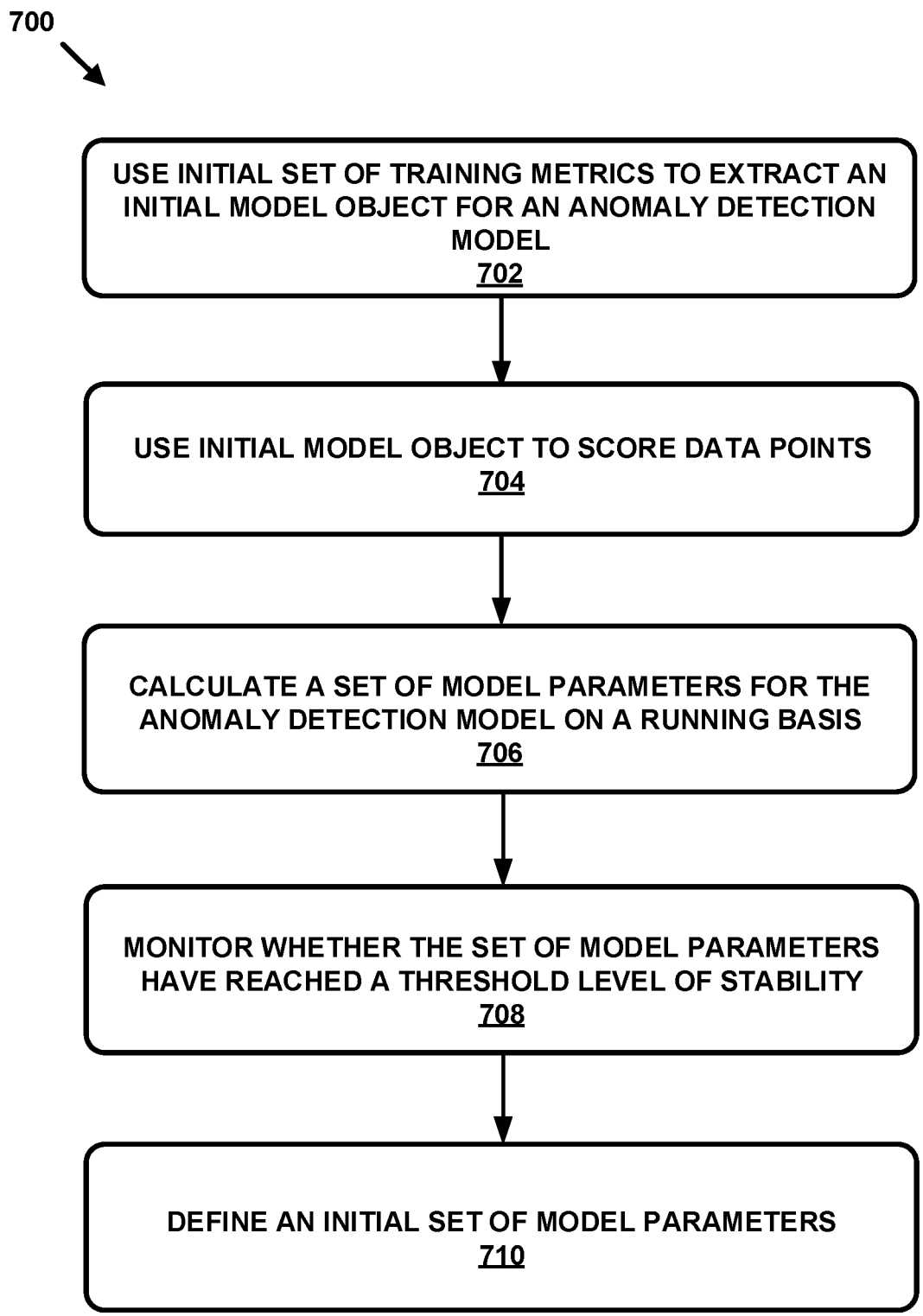
FIG. 7 is a flow diagram showing some example functions that may be carried out as part of the model creation phase of the disclosed process.

FIG. 7 is a flow diagram 700 showing some example functions that may be carried out as part of model creation phase 605. As with FIG. 6, these example functions are described as being carried out by a data analytics platform that is receiving a stream of multivariate data points originating from data source 601, but some or all of the example functions could be performed by some other entity. Further, it should be understood that flow diagram 700 is provided for sake of clarity and explanation and that numerous other combinations of functions may be utilized to carry out model creation phase 605—including the possibility that example functions may be added, removed, rearranged into different orders, combined into fewer blocks, and/or separated into additional blocks depending upon the particular embodiment.

As shown in FIG. 7, model creation phase 605 may begin at block 702 with the data analytics platform using the initial set of training metrics to extract an initial model object for the anomaly detection model. Depending on the type of anomaly detection model being created, the initial model object—and the function of extracting that initial model object—may take various forms.

For instance, in an example where the anomaly detection model comprises a PCA-based anomaly detection model, the initial model object may take the form of a projection matrix that is extracted by performing PCA on a correlation matrix that is either included within the initial set of training metrics defined during training metrics phase 604 or is derived from the other training metrics included in the initial set of training metrics. The initial model object may take other forms and be extracted in other manners as well.

After extracting the initial model object, at block 704, the data analytics platform may begin using the initial model object to score the multivariate data points originating from data source 601 that are received during model creation phase 605. Depending on the type of anomaly detection model being created, the function of scoring a data point using the initial model object may take various forms.

For instance, in an example where the anomaly detection model comprises a PCA-based anomaly detection model, the function of scoring a data point may involve (1) inputting the data point into the projection matrix and thereby transforming the data point from its original coordinate space to the PCA coordinate space defined by the projection matrix (which may involve standardization and/or modification of the data point's value in one or more dimensions of the PCA coordinate space), (2) inversely transforming the data point from the PCA coordinate space back to the original coordinate space, which produces a "predicted" version of the data point, and (3) determining a respective difference value between original and predicted versions of the data point. The function of scoring a data point using the initial model object may take various forms as well.

At block 706, while using the initial model object to score the multivariate data points originating from data source 601 that are received during model creation phase 605, the data analytics platform may calculate a set of model parameters for the anomaly detection model on a running basis. Depending on the type of anomaly detection model being created, the set of model parameters—and the process for calculating these model parameters—may take various forms.

As one possibility, the set of model parameters for the anomaly detection model may take the form of a set of anomaly thresholds for the anomaly detection model, where an "anomaly threshold" comprises a threshold at which the amount of difference between streaming data values for a given data variable and the expected values of such streaming data values is considered to be anomalous. Thus, when streaming data values for any given data variable deviate from expected behavior to the point of falling outside of an anomaly threshold, the data analytics platform may consider this to be an "exceedance."

The set of anomaly thresholds for the anomaly detection model may take various forms. According to one example, the set of anomaly thresholds may comprise a respective pair of upper and lower anomaly thresholds for each relevant streaming data variable, where (1) the upper anomaly threshold defines a threshold at which the amount of difference between streaming data values for a given data variable and the expected values of such streaming data values in the "positive" direction is considered to be anomalous and (2) the lower anomaly threshold defines a threshold at which the amount of difference between streaming data values for a given data variable and the expected values of such streaming data values in the "negative" direction is considered to be anomalous.

According to another example, the set of anomaly thresholds may include only a single anomaly threshold for a given streaming data variable. In such an example, the single anomaly threshold may serve as the threshold for deviation in either the "positive" or "negative" direction, or in circumstances where a deviation in the given streaming data variable in one particular direction is not relevant to the occurrence of anomalies, the single anomaly threshold for the given streaming data variable may serve as the threshold for deviation in only in the other direction. The set of anomaly thresholds for the anomaly detection model may take other forms as well.

Further, the function of calculating the set of anomaly thresholds on a running basis may take various forms. As one possibility, the function of calculating the set of anomaly thresholds on a running basis may involve calculating an update to the set anomaly thresholds each time a new data point is scored using the initial model object. As another possibility, the function of calculating the set of anomaly thresholds on a running basis may involve calculating an update to the set of anomaly thresholds after a certain number of new streaming data points have been scored since the last update and/or after a certain amount of time has elapsed since the last update. The function of calculating the set of anomaly thresholds on a running basis may take other forms as well.

Further yet, the function of calculating each individual update to the set anomaly thresholds may take various forms. In one implementation, the data analytics platform may determine an upper or lower anomaly threshold for a given data variable by (1) evaluating the data points that have been previously been received and scored during model creation phase 605 to identify each data point having a respective difference value for the given operating variable in the "positive" direction (for an upper threshold) or the "negative" direction (for the lower threshold) and then (2)

calculating a given number of standard deviations of the identified difference values in the "positive" direction (for an upper threshold) or the "negative" direction (for the lower threshold) to use as the anomaly threshold.

In another implementation, the data analytics platform may determine an upper or lower anomaly threshold for a given data variable by (1) evaluating the data points that have been previously been received and scored during model creation phase 605 to identify each data point having a respective difference value for the given operating variable in the "positive" direction (for an upper threshold) or the "negative" direction (for the lower threshold), (2), selecting the maximum difference value for the given data variable in the "positive" direction (for an upper threshold) or the "negative" direction (for the lower threshold), and (3) optionally multiplying the maximum difference value by a multiplication factor that is used to adjust the tolerance of the threshold, which could either be a value of 1 (in which case the maximum difference value would serve as the anomaly threshold), a value greater than 1 (in which case the anomaly threshold would be higher than the maximum difference value), or a value less than 1 (in which case the anomaly threshold would be less than the maximum difference value). In this respect, the multiplication factor either may be a value that is specific to the given data variable at issue and/or the type of anomaly threshold at issue (upper vs. lower) or may be a "global" value that is used for multiple different data variables and/or types of anomaly thresholds.

In yet another implementation, the data analytics platform may (1) determine an upper anomaly threshold for a given data variable by determining the $95^{th}$ percentile statistic of the difference values for the given operating data variable over the data points that have been previously been received and scored during model creation phase 605 and then optionally multiplying the determined statistic by a multiplication factor that is used to adjust the tolerance of the threshold (2) determine a lower anomaly threshold for the given data variable by determining the $5^{th}$ percentile statistic of the difference values for the given operating data variable over the data points that have been previously been received and scored during model creation phase 605 and then optionally multiplying the determined statistic by a multiplication factor that is used to adjust the tolerance of the threshold.

In still other implementations, the data analytics platform may use statistics such as the root-mean square or the mean absolute difference to define the magnitude of the upper and lower anomaly thresholds for a given data variable. However, the data analytics platform may determine an upper and/or lower anomaly threshold for a given data variable in various other manners as well.

The set of model parameters for the anomaly detection model—and the process for calculating these model parameters on a running basis—may take various other forms as well.

At step 708, while calculating the set of model parameters for the anomaly detection model on a running basis, the data analytics platform may monitor whether the set of model parameters have reached a threshold level of stability. In other words, during this phase, the data analytics platform may determine whether there has been enough data points received from data source 601 during model creation phase 605 such that the model parameters being calculated on a running basis are no longer changing significantly. Depending on the type of model parameters at issue, this function may take various forms.

For instance, in an embodiment where the set of model parameters for the anomaly detection model comprises a set of anomaly thresholds, this function may involve monitoring whether the anomaly thresholds have reached a threshold level of stability, which may be carried out in various manners.

In one implementation, the data analytics platform may be configured to periodically sample the anomaly thresholds' values while they are being calculated on a running basis. For instance, the data analytics platform may be configured to sample the anomaly thresholds' values each time a certain number of new streaming data points have been received since the last sample was captured (e.g., sampling the anomaly thresholds' values every 100 streaming data points) and/or each time a certain amount of time has elapsed since the last sample was captured. The data analytics platform may be configured to sample the anomaly thresholds' values at other times as well.

As the data analytics platform is periodically sampling the anomaly thresholds' values, the data analytics platform may also periodically evaluate a certain number of the most-recent samples of the anomaly thresholds' values (e.g., the 10 most-recently captured samples) relative to one another to determine whether such samples are similar enough (i.e., whether such samples have converged enough) to indicate that the anomaly thresholds have reached a threshold level of stability. For instance, as one possibility, the data analytics platform may perform such an evaluation each time the data analytics platform captures a new sample of the anomaly thresholds' values, which effectively amounts to a sliding window approach where each new sample replaces the oldest sample in the set of most-recent samples to be evaluated. As another possibility, the data analytics platform may perform such an evaluation each time a certain number of new samples have been captured since the last evaluation was performed (e.g., after 10 new samples have been captured), where the number of new samples to be captured before the next evaluation could either be the same as or different than the number of most-recent samples to be evaluated relative to one another. As yet another possibility, the data analytics platform may perform such an evaluation each time a certain amount of time has elapsed since the last sample last evaluation was performed. The data analytics platform may be configured to evaluate a set of most-recent samples of the anomaly thresholds' values at other times as well.

Further, the data analytics platform's evaluation of the set of most-recent samples of the anomaly thresholds' values relative to one another may take various forms. As one possibility, this evaluation may involve (1) if necessary, transforming the most-recent samples of the anomaly thresholds' values into a format that enables the data analytics platform to measure a distance between these samples, (2) calculating a respective distance between each different pairwise combination of samples in the set of most recent samples, and (3) determining whether each such distance falls below a threshold that defines a maximum allowable distance between a pair of samples that are considered to have sufficiently converged. However, the data analytics platform may determine whether the set of most-recent samples of the anomaly thresholds' values are similar enough to one another to indicate that the anomaly thresholds have reached a threshold level of stability in various other manners as well.

The function of monitoring whether the model parameters have reached a threshold level of stability may take other forms as well.

At some point while performing the monitoring function at step 708, the data analytics platform may determine that the model parameters have reached a threshold level of stability. In response to such a determination, then at step 710, the data analytics platform may define the model parameters at the time of this determination to be the initial set of model parameters for the anomaly detection model. In other words, the data analytics platform may define an initial set of model parameters to include the most-updated version of the model parameters at the time that the threshold level of stability has been reached.

After the data analytics platform defines the initial set of model parameters for the anomaly detection model, the data analytics platform may transition from model creation phase 605 to model deployment phase 606 of the disclosed process, which may cause data acquisition phase 602 to begin directing the received stream of multivariate data points originating from data source 601 to model deployment phase 606.

E. Model Deployment Phase

Model deployment phase 606 is generally directed to using the created anomaly detection model to determine whether an anomaly has occurred in the stream of multivariate data points originating from data source 601. This phase may take various forms and be carried out in various manners.

As one possibility, model deployment phase 606 may first begin with the data analytics platform using the created anomaly detection model to score the multivariate data points originating from data source 601 that are received during model deployment phase 606. Depending on the type of anomaly detection model being executed, the function of scoring a data point using the initial model object may take various forms.

For instance, in an example where the anomaly detection model comprises a PCA-based anomaly detection model, the function of scoring a data point may involve (1) inputting the data point into the projection matrix and thereby transforming the data point from its original coordinate space to the PCA coordinate space defined by the projection matrix (which may involve standardization and/or modification of the data point's value in one or more dimensions of the PCA coordinate space), (2) inversely transforming the data point from the PCA coordinate space back to the original coordinate space, which produces a "predicted" version of the data point, and (3) determining a respective difference value between original and predicted versions of the data point. The function of scoring a data point using the anomaly detection model may take various forms as well.

While using the created anomaly detection model to score the multivariate data points originating from data source 601 that are received during model deployment phase 606, the data analytics platform may evaluate whether any of the streaming data points received from data source 601 violate the initial set of model parameters for the created anomaly detection model. For instance, if the initial set of model parameters comprise a set of anomaly thresholds, then the data analytics platform may evaluate whether the respective difference between the original and predicted versions of any streaming data point exceeds (i.e., falls outside of) any anomaly threshold within that initial set. In this respect, as discussed above, each streaming data point found to violate the initial set of model parameters for the created anomaly detection model may be referred to as an "exceedance."

In turn, the data analytics platform may evaluate whether the exceedances detected in the stream of multivariate data points originating from data source 601 that are received during model deployment phase 606 collectively amount to an anomaly. The data analytics platform may perform this function in various manners.

As one possibility, the data analytics platform may determine that an anomaly has occurred when a threshold number of exceedances have been detected in the streaming data received from data source 601 within a given window of data points. For instance, using a sliding window approach, the data analytics platform may determine whether a threshold number of exceedances have been detected over a given number of data points (e.g., the last 50 data points received) or over a given period of time (e.g., the last day, hour, minute, etc.). If there have been a threshold number of exceedances detected within the given window of data points, the data analytics platform may determine that an anomaly has occurred.

An example of this sliding window approach will now be described with reference to FIGS. 8A-C, which show the application of an upper anomaly threshold 802 and a lower anomaly threshold 804 for a given data variable to the difference signal produced by a PCA-based anomaly detection model for that data variable. As shown in these figures, there are a number of instances where the difference signal exceeds (i.e., falls outside) the upper and/or lower anomaly thresholds, and these instances would each be considered an exceedance. However, whether or not these exceedances lead to a determination that an anomaly has occurred may depend on the extent of exceedances that have occurred within the sliding window under evaluation.

Figure 8A:
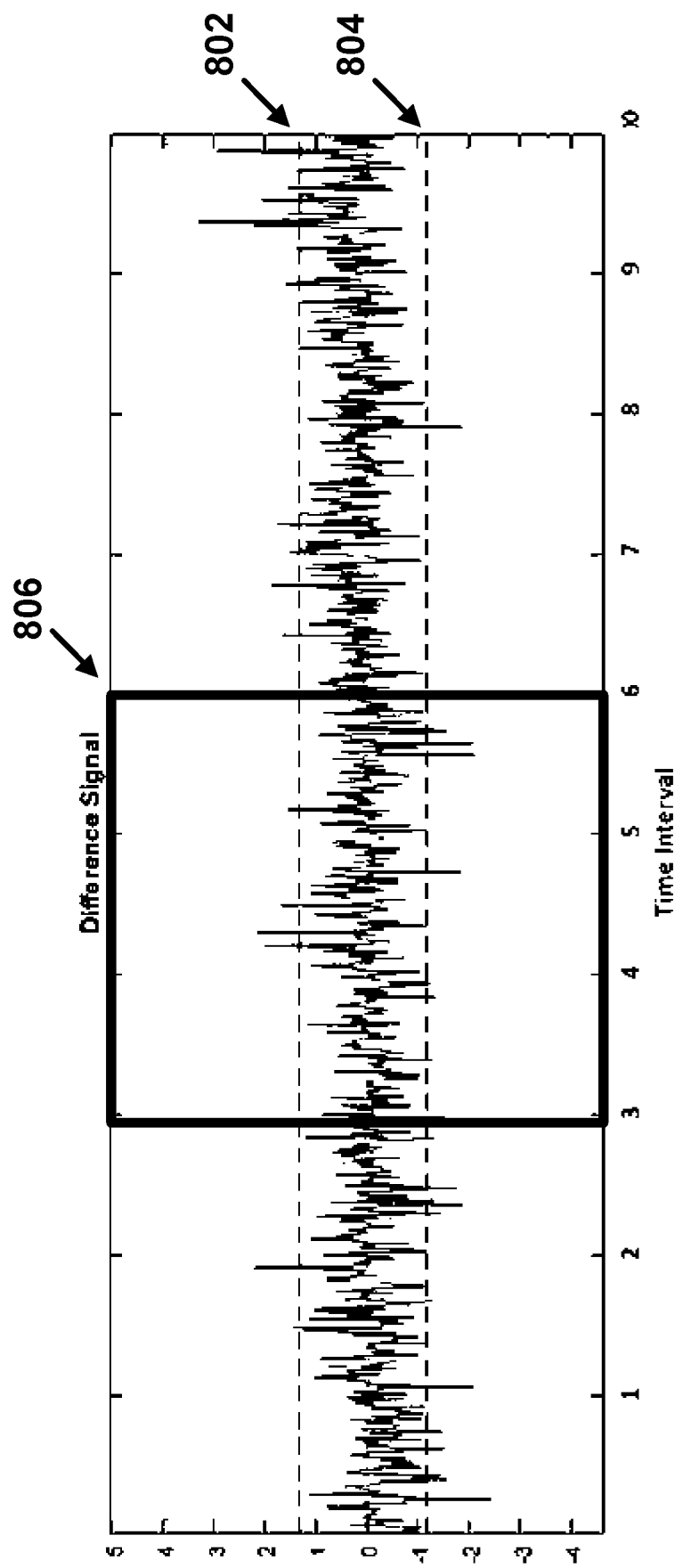
FIGS. 8A-C show a set of time-series graphs that illustrate an example difference signal for a given data variable.

For instance, FIG. 8A illustrates a first sliding window 806 positioned between time interval 3 and time interval 6, which may be the sliding window under evaluation at the time that the data analytics platform has received the data point at or around time interval 6. Within sliding window 806, there appears to be at least 11 exceedances that have occurred.

Figure 8B:
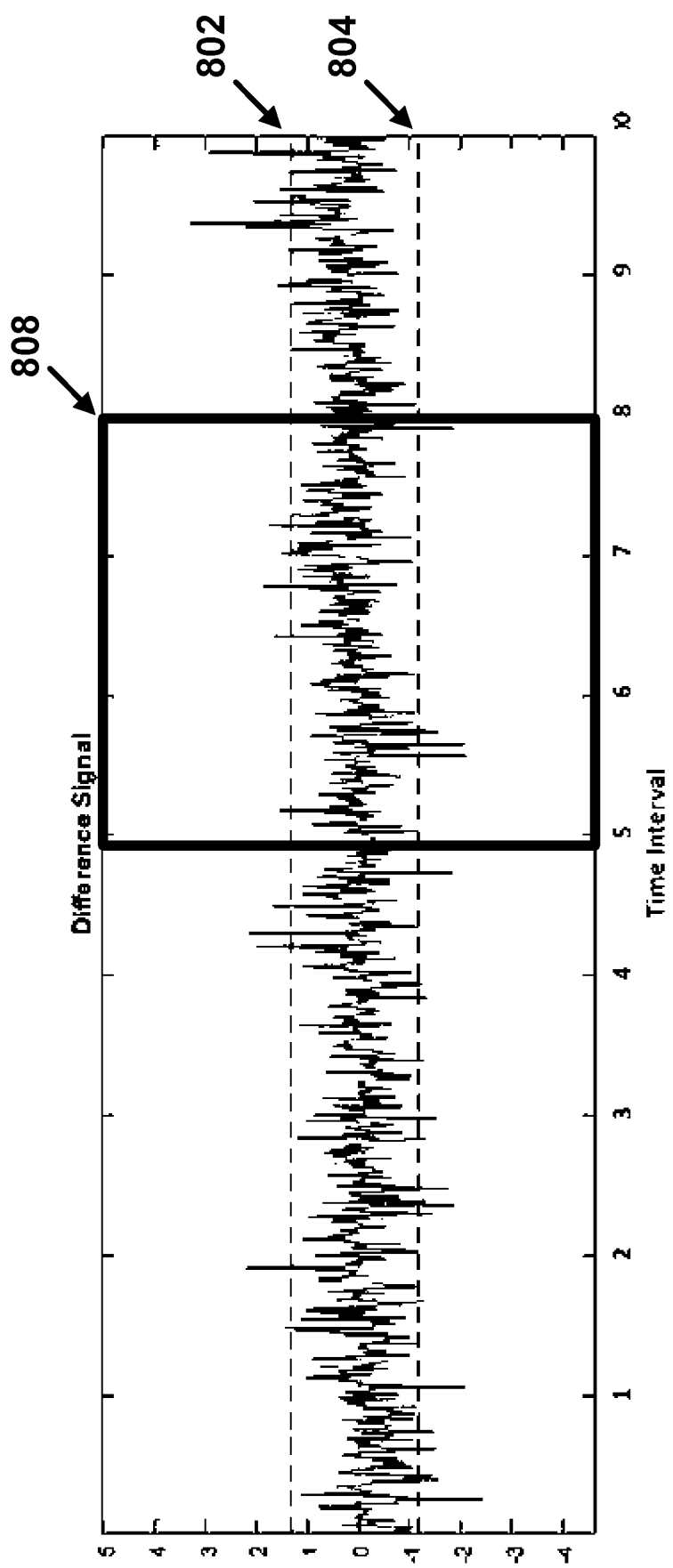

Further, FIG. 8B illustrates a second sliding window 808 positioned between time interval 5 and time interval 8, which may be the sliding window under evaluation at the time that the data analytics platform has received the data point at or around time interval 8. Within sliding window 808, there appears to be at least 9 exceedances that have occurred.

Figure 8C:
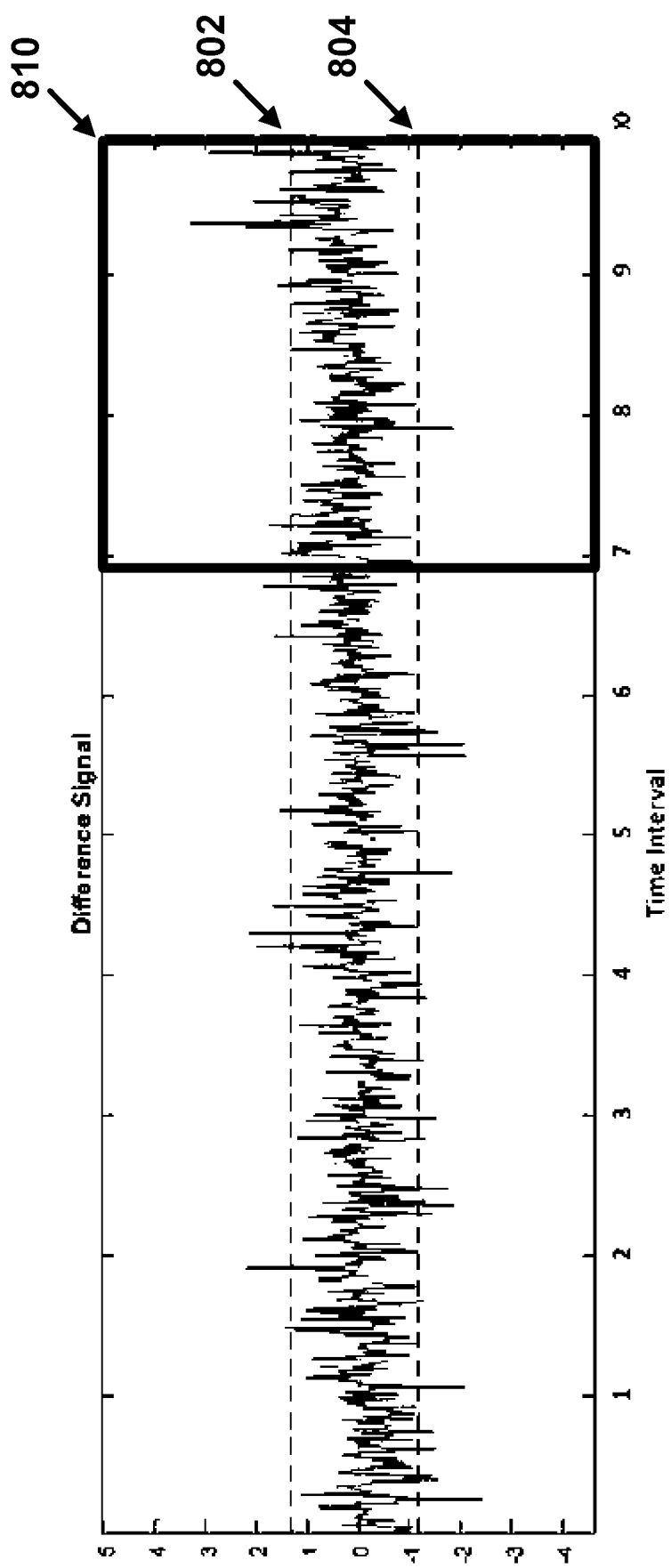

Further yet, FIG. 8C illustrates a third sliding window 810 positioned between time interval 7 and time interval 10, which may be the sliding window under evaluation at the time that the data analytics platform has received the data point at or around time interval 10. Within sliding window 810, there appears to be at least 11 exceedances that have occurred.

Based on the foregoing, if the threshold extent of exceedances that comprises an anomaly is set at 10 or 11 exceedances within the length of the sliding window, then the data analytics platform may determine that an anomaly has occurred at each of time interval 6 and time interval 10, but not time interval 8. Alternatively, if the threshold extent of exceedances that comprises an anomaly is set at 9 or lower exceedances within the length of the sliding window, then the data analytics platform may determine that an anomaly has occurred at each of time interval 6, time interval 8, and time interval 10. Alternatively yet, if the threshold extent of exceedances that comprises an anomaly is set at 12 or more exceedances within the length of the sliding window, then the data analytics platform may determine that no anomaly has occurred at any of time interval 6, time interval 8, and time interval 10.

The data analytics platform may use the created anomaly detection model to determine whether an anomaly has occurred in the stream of multivariate data points originating from data source 601 in other manners as well.

After the disclosed process has progressed to model deployment phase 606, the data analytics platform may then continue to use the created anomaly detection model to monitor for anomalies as the data analytics system continues to receive the stream of multivariate data points originating from data source 601.

F. Updating the Anomaly Detection Model

In some embodiments, even after establishing the initial set of training metrics during training metrics phase 604, the data analytics platform may continue to calculate the set of training metrics on a running basis using streaming data points originating from data source 601 that are received after training metrics phase 604. In this respect, the particular set of data points used by the data analytics platform to continue calculating the set of training metrics on a running basis may take various forms. As one possibility, this set of data points may include all of the data points received after training metrics phase 604, including the data points received during model creation phase 605 (which are also used to determine the initial set of model parameters) and the data points received during model creation phase 606. As another possibility, this set of data points may include only the data points received during model deployment phase 606. As still another possibility, this set of data points may include a subset of the data points received during model creation phase 605 and/or model deployment phase 606. For instance, in one implementation, the data analytics platform may continue calculating the set of training metrics on a running basis using only data points received during model deployment phase 606 that were found not to be exceedances. The set of data points used by the data analytics platform to continue calculating the set of training metrics may take other forms as well.

While continuing to calculate the set of training metrics on a running basis, the data analytics platform may also periodically compare the values of the current set of training metrics to the values of the initial set of training metrics, to determine whether the current set of training metrics has diverged from the initial set of training metrics by a threshold extent. In this respect, the data analytics platform may perform this comparison by (1) if necessary, transforming the initial and current sets of training metrics into a format that enables the data analytics platform to measure a distance between these sets of training metrics, (2) calculating a distance between the initial and current sets of training metrics, and (3) determining whether this distance exceeds a threshold that defines the point at which two sets of training metrics have meaningfully diverged.

If one of these periodic comparisons results in a determination that the current set of training metrics has diverged from the initial set of training metrics by a threshold extent, this may then trigger the data analytics platform to (1) re-run model creation phase 605 of the disclosed process such that an updated model object is extracted and an updated set of model parameters is determined and (2) re-deploy the anomaly detection model with the updated model object and the updated set of model parameters.

In other embodiments, even after defining the initial set of model parameters for the anomaly detection model during model creation phase 605, the data analytics platform may continue to calculate the set of model parameters on a running basis using streaming data points originating from data source 601 that are received after model creation phase 605 (i.e., data points received during model deployment phase 606). In this respect, the particular set of data points used by the data analytics platform to continue calculating the set of model parameters on a running basis may take various forms. As one possibility, this set of data points may include all the data points received during model deployment phase 606. As another possibility, this set of data points may include only a subset of the data points received during model deployment phase 606. For instance, in one implementation, the data analytics platform may continue calculating the set of model parameters on a running basis using only data points received during model deployment phase 606 that were found not to be exceedances. The set of data points used by the data analytics platform to continue calculating the set of training metrics may take other forms as well.

While continuing to calculate the set of model parameters on a running basis, the data analytics platform may also periodically compare the values of the current set of model parameters to the values of the initial set of model parameters, to determine whether the current set of model parameters has diverged from the initial set of model parameters by a threshold extent. In this respect, the data analytics platform may perform this comparison by (1) if necessary, transforming the initial and current sets of model parameters into a format that enables the data analytics platform to measure a distance between these sets of model parameters, (2) calculating a distance between the initial and current sets of model parameters, and (3) determining whether this distance exceeds a threshold that defines the point at which two sets of model parameters have meaningfully diverged.

If one of these periodic comparisons results in a determination that the current set of model parameters has diverged from the initial set of model parameters by a threshold extent, this may then trigger the data analytics platform to (1) update the set of model parameters for the anomaly detection model and (2) re-deploy the anomaly detection model with the updated set model parameters.

The data analytics platform may update the anomaly detection model in various other manners as well.

G. Scheduling Multiple Instances of Certain Functions

Based on the foregoing, it will be appreciated that a data analytics platform may be tasked with the responsibility of performing multiple instances of the disclosed process (or at least aspects of the disclosed process) in parallel with one another. For example, in a scenario where the stream of multivariate data points originating from data source 601 may belong to multiple different modes, a data analytics platform may be tasked with the responsibility of carrying out multiple instances of phases 604-606 in parallel. As another example, if a data analytics platform is receiving streaming data from multiple different data sources in parallel, the data analytics platform may be tasked with the responsibility of carrying out multiple instances of the disclosed process in parallel. Other examples are possible as well.

However, in line with the discussion above, certain functions of the disclosed process may be resource intensive for a data analytics platform—including the function of extracting the model object for the anomaly detection model. In this respect, when a data analytics platform is tasked with performing multiple instances of a given resource-intensive function in parallel, an unnecessary strain may be placed on the data analytics platform that may inhibit the platform's ability to perform other tasks.

To avoid the drawbacks associated with performing multiple instances of a given resource-intensive function in parallel, in some embodiments, a data analytics platform may be configured to intelligently schedule its execution of multiple instances of a resource-intensive function such that the data analytics platform is not performing the multiple instances of the resource-intensive function at the same time. For example, if the data analytics platform is tasked with the responsibility of extracting model objects for multiple different anomaly detection models, the data analytics platform may be configured to stagger its execution of the resource-intensive extracting function such that it is not extracting multiple model objects at the time.

In a similar manner, a data analytics platform may also be configured to intelligently schedule its execution of other resource-intensive functions to minimize how many of these functions are executed at the same time.

V. CONCLUSION

Example embodiments of the disclosed process have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

What is claimed is:

1. A computing system comprising:
   a communication interface configured to receive data from at least one data source;
   at least one processor;
   a non-transitory computer-readable medium; and
   program instructions stored on the non-transitory computer-readable medium that are executable by the at least one processor to cause the computing system to:
   receive, via the communication interface, a stream of multivariate data points originating from a given data source;
   operate in a first mode during which the computing system calculates a set of training metrics on a running basis as the computing system receives the stream of multivariate data points originating from the given data source;
   while operating in the first mode, make a determination that the set of training metrics being calculated on a running basis has reached a first threshold level of stability, wherein the set of training metrics at the time of the determination is defined as an initial set of training metrics to use for creating an anomaly detection model that comprises an initial model object and an initial set of model parameters;
   in response to the determination that the set of training metrics being calculated on a running basis has reached the first threshold level of stability, transition to a second mode during which the computing system (a) uses the initial set of training metrics to extract the initial model object for the anomaly detection model and (b) uses the initial model object for the anomaly detection model to calculate a set of model parameters for the anomaly detection model on a running basis as the computing system continues to receive the stream of multivariate data points originating from the given data source;
   while operating in the second mode, make a determination that the set of model parameters being calculated on a running basis has reached a second threshold level of stability, wherein the set of model parameters at the time of the determination is defined as the initial set of model parameters for the anomaly detection model;
   in response to the determination that the set of model parameters being calculated on a running basis has reached the second threshold level of stability, transition to a third mode during which the computing system uses the anomaly detection model to monitor for anomalies as the computing system continues to receive the stream of multivariate data points originating from the given data source by:
      (i) using the initial model object for the anomaly detection model to score each of at least a subset of the multivariate data points in the stream of multivariate data points received during the third mode,
      (ii) evaluating whether a threshold extent of multivariate data points within a given window of time violate the initial set of model parameters for the anomaly detection model, and
      (iii) determining that an anomaly has occurred if it is determined that a threshold extent of multivariate data points within the given window of time violate the initial set of model parameters for the anomaly detection model.

2. The computing system of claim 1, wherein the stream of multivariate data points originating from the given data source comprises a stream of operating data originating from a given asset.

3. The computing system of claim 1, wherein:
   the anomaly detection model comprises a regression model based on principal component analysis (PCA);
   the set of training metrics comprise a mean, a variance, a max, a min, a streaming object, and a correlation matrix;
   the initial model object comprises a projection matrix; and
   the initial set of model parameters comprises a set of anomaly thresholds.

4. The computing system of claim 1, wherein a first temporal range of the stream of multivariate data points is received during the first mode, a second temporal range of the stream of multivariate data points is received during the second mode, and a third temporal range of the stream of multivariate data points is received during the third mode.

5. The computing system of claim 4, further comprising program instructions stored on the non-transitory computer-readable medium that are executable by the at least one processor to cause the computing system to:
   after the initial set of training metrics is defined, continue calculating the set of training metrics on a running basis as the computing system continues to receive one or both of the second temporal range and the third temporal range of the stream of multivariate data points;
   make a determination that the set of training metrics being calculated on a running basis has diverged from the initial set of training metrics by a threshold extent, wherein the set of training metrics at the time of the determination is defined as an updated set of training metrics to use for creating an updated anomaly detection model that comprises an updated model object and an updated set of model parameters;
   in response to the determination that the set of training metrics being calculated on a running basis has diverged from the initial set of training metrics by the threshold extent, use the updated set of training metrics as a basis for extracting the updated model object and defining the updated set of model parameters; and begin to use the updated anomaly detection model to monitor for anomalies as the computing system continues to receive the stream of multivariate data points originating from the given data source.

6. The computing system of claim 5, wherein the program instructions stored on the non-transitory computer-readable medium that are executable by the at least one processor to cause the computing system to continue calculating the set of training metrics on a running basis as the computing system continues to receive one or both of the second temporal range and the third temporal range of the stream of multivariate data points comprise program instructions stored on the non-transitory computer-readable medium that are executable by the at least one processor to cause the computing system to continue calculating the set of training metrics on a running basis using only the multivariate data points in the third temporal range of the stream of multivariate data points that do not violate the initial set of model parameters for the anomaly detection model.

7. The computing system of claim 4, further comprising program instructions stored on the non-transitory computer-readable medium that are executable by the at least one processor to cause the computing system to:

after the initial set of model parameters is defined, continue calculating the set of model parameters on a running basis as the computing system continues to receive the third temporal range of the stream of multivariate data points;

make a determination that the set of model parameters being calculated on a running basis has diverged from the initial set of model parameters by a threshold extent, wherein the set of model parameters at the time of the determination is defined as an updated set of model parameters to use for creating an updated anomaly detection model that comprises the initial model object and the updated set of model parameters; and begin to use the updated anomaly detection model to monitor for anomalies as the computing system continues to receive the stream of multivariate data points originating from the given data source.

8. The computing system of claim 7, wherein the program instructions stored on the non-transitory computer-readable medium that are executable by the at least one processor to cause the computing system to continue calculating the set of model parameters on a running basis as the computing system continues to receive the third temporal range of the stream of multivariate data points comprise program instructions stored on the non-transitory computer-readable medium that are executable by the at least one processor to cause the computing system to continue calculating the set of model parameters on a running basis using only the multivariate data points in the third temporal range of the stream of multivariate data points that do not violate the initial set of model parameters for the anomaly detection model.

9. The computing system of claim 1, wherein the given data source is capable of outputting multivariate data points belonging to a plurality of different modes, wherein the anomaly detection model is associated with one given mode of the plurality of different modes, and wherein the computing system further comprises program instructions stored on the non-transitory computer-readable medium that are executable by the at least one processor to cause the computing system to:

while receiving the stream of multivariate data points originating from the given data source, detect a mode to which each data point in the stream of multivariate data points belongs; and proceed to use only the multivariate data points within the stream of multivariate data points that belong to the one given mode.

10. A method performed by a computing system, the method comprising:

receiving, at the computing system, a stream of multivariate data points originating from a given data source;

operating in a first mode during which the computing system calculates a set of training metrics on a running basis as the computing system receives the stream of multivariate data points originating from the given data source;

while operating in the first mode, making a determination that the set of training metrics being calculated on a running basis has reached a first threshold level of stability, wherein the set of training metrics at the time of the determination is defined as an initial set of training metrics to use for creating an anomaly detection model that comprises an initial model object and an initial set of model parameters;

in response to the determination that the set of training metrics being calculated on a running basis has reached the first threshold level of stability, transitioning to a second mode during which the computing system (a) uses the initial set of training metrics to extract the initial model object for the anomaly detection model and (b) uses the initial model object for the anomaly detection model to calculate a set of model parameters for the anomaly detection model on a running basis as the computing system continues to receive the stream of multivariate data points originating from the given data source;

while operating in the second mode, making a determination that the set of model parameters being calculated on a running basis has reached a second threshold level of stability, wherein the set of model parameters at the time of the determination is defined as the initial set of model parameters for the anomaly detection model;

in response to the determination that the set of model parameters being calculated on a running basis has reached the second threshold level of stability, transitioning to a third mode during which the computing system uses the anomaly detection model to monitor for anomalies as the computing system continues to receive the stream of multivariate data points originating from the given data source by:

(i) using the initial model object for the anomaly detection model to score each of at least a subset of the multivariate data points in the stream of multivariate data points received during the third mode, (ii) evaluating whether a threshold extent of multivariate data points within a given window of time violate the initial set of model parameters for the anomaly detection model, and (iii) determining that an anomaly has occurred if it is determined that a threshold extent of multivariate data points within the given window of time violate the initial set of model parameters for the anomaly detection model.

11. The method of claim 10, wherein:
the anomaly detection model comprises a regression model based on principal component analysis (PCA);
the set of training metrics comprise a mean, a variance, a max, a min, a streaming object, and a correlation matrix;
the initial model object comprises a projection matrix; and
the initial set of model parameters comprises a set of anomaly thresholds.

12. The method of claim 10, wherein a first temporal range of the stream of multivariate data points is received during the first mode, a second temporal range of the stream of multivariate data points is received during the second mode, and a third temporal range of the stream of multivariate data points is received during the third mode.

13. The method of claim 12, further comprising:
after the initial set of training metrics is defined, continuing to calculate the set of training metrics on a running basis as the computing system continues to receive one or both of the second temporal range and the third temporal range of the stream of multivariate data points;
making a determination that the set of training metrics being calculated on a running basis has diverged from the initial set of training metrics by a threshold extent, wherein the set of training metrics at the time of the determination is defined as an updated set of training metrics to use for creating an updated anomaly detection model that comprises an updated model object and an updated set of model parameters;
in response to the determination that the set of training metrics being calculated on a running basis has diverged from the initial set of training metrics by the threshold extent, using the updated set of training metrics as a basis for extracting the updated model object and defining the updated set of model parameters; and
beginning to use the updated anomaly detection model to monitor for anomalies as the computing system continues to receive the stream of multivariate data points originating from the given data source.

14. The method of claim 13, wherein continuing to calculate the set of training metrics on a running basis as the computing system continues to receive one or both of the second temporal range and the third temporal range of the stream of multivariate data points comprises:
continuing to calculate the set of training metrics on a running basis using only the multivariate data points in the third temporal range of the stream of multivariate data points that do not violate the initial set of model parameters for the anomaly detection model.

15. The method of claim 12, further comprising:
after the initial set of model parameters is defined, continuing to calculate the set of model parameters on a running basis as the computing system continues to receive the third temporal range of the stream of multivariate data points;
making a determination that the set of model parameters being calculated on a running basis has diverged from the initial set of model parameters by a threshold extent, wherein the set of model parameters at the time of the determination is defined as an updated set of model parameters to use for creating an updated anomaly detection model that comprises the initial model object and the updated set of model parameters; and
beginning to use the updated anomaly detection model to monitor for anomalies as the computing system continues to receive the stream of multivariate data points originating from the given data source.

16. The method of claim 15, wherein continuing to calculate the set of model parameters on a running basis as the computing system continues to receive the third temporal range of the stream of multivariate data points comprises continuing to calculate the set of model parameters on a running basis using only the multivariate data points in the third temporal range of the stream of multivariate data points that do not violate the initial set of model parameters for the anomaly detection model.

17. The method of claim 10, wherein the given data source is capable of outputting multivariate data points belonging to a plurality of different modes, and wherein the anomaly detection model is associated with one given mode of the plurality of different modes, the method further comprising:
while receiving the stream of multivariate data points originating from the given data source, detecting a mode to which each data point in the stream of multivariate data points belongs; and
proceeding to use only the multivariate data points within the stream of multivariate data points that belong to the one given mode.

18. A non-transitory computer-readable storage medium having program instructions stored thereon that are executable to cause a computing system to:
receive a stream of multivariate data points originating from a given data source;
operate in a first mode during which the computing system calculates a set of training metrics on a running basis as the computing system receives the stream of multivariate data points originating from the given data source;
while operating in the first mode, make a determination that the set of training metrics being calculated on a running basis has reached a first threshold level of stability, wherein the set of training metrics at the time of the determination is defined as an initial set of training metrics to use for creating an anomaly detection model that comprises an initial model object and an initial set of model parameters;
in response to the determination that the set of training metrics being calculated on a running basis has reached the first threshold level of stability, transition to a second mode during which the computing system (a) uses the initial set of training metrics to extract the initial model object for the anomaly detection model and (b) uses the initial model object for the anomaly detection model to calculate a set of model parameters for the anomaly detection model on a running basis as the computing system continues to receive the stream of multivariate data points originating from the given data source;
while operating in the second mode, make a determination that the set of model parameters being calculated on a running basis has reached a second threshold level of stability, wherein the set of model parameters at the time of the determination is defined as the initial set of model parameters for the anomaly detection model;
in response to the determination that the set of model parameters being calculated on a running basis has reached the second threshold level of stability, transition to a third mode during which the computing system uses the anomaly detection model to monitor for anomalies as the computing system continues to receive the stream of multivariate data points originating from the given data source by:
(i) using the initial model object for the anomaly detection model to score each of at least a subset of the multivariate data points in the stream of multivariate data points received during the third mode,
(ii) evaluating whether a threshold extent of multivariate data points within a given window of time violate the initial set of model parameters for the anomaly detection model, and
(iii) determining that an anomaly has occurred if it is determined that a threshold extent of multivariate data points within the given window of time violate the initial set of model parameters for the anomaly detection model.

* * * * *